United States Patent
Karoui

(10) Patent No.: US 11,888,576 B2
(45) Date of Patent: Jan. 30, 2024

(54) SYSTEM AND METHOD FOR SUPPRESSING UPLINK INTERFERENCE SIGNALS GENERATED IN A MULTI-SPOT SPACE COMMUNICATION SYSTEM

(71) Applicant: THALES, Courbevoie (FR)

(72) Inventor: Walid Karoui, Toulouse (FR)

(73) Assignee: THALES, Courbevoie (FR)

( * ) Notice: Subject to any disclaimer, the term of this patent is extended or adjusted under 35 U.S.C. 154(b) by 131 days.

(21) Appl. No.: 17/479,908

(22) Filed: Sep. 20, 2021

(65) Prior Publication Data
US 2022/0094427 A1    Mar. 24, 2022

(30) Foreign Application Priority Data
Sep. 24, 2020   (FR) ...................................... 2009687

(51) Int. Cl.
H04B 7/185    (2006.01)
(52) U.S. Cl.
CPC ................................ H04B 7/18513 (2013.01)
(58) Field of Classification Search
CPC ............ H04B 7/18513; H04B 7/18539; H04B 7/1851; H04B 7/18545; H04W 16/28; H04W 84/06
See application file for complete search history.

(56) References Cited

U.S. PATENT DOCUMENTS

2015/0123843 A1    5/2015  Lier et al.
2021/0167847 A1*   6/2021  Jin ....................... H04B 7/1851

FOREIGN PATENT DOCUMENTS

EP          1 189 303 A2    3/2002
WO       2017/009562 A1    1/2017

* cited by examiner

*Primary Examiner* — Fred A Casca
(74) *Attorney, Agent, or Firm* — BakerHostetler

(57) ABSTRACT

A method for suppressing interference signals generated between satellite access stations of a multi-spot communication system is implemented by a distributed on-board and ground subsystem which comprises, on board a multi-spot communication payload, one or more opposition matrices, switches of an input switch assembly connected to the output of the reception sources of the reception antenna, and switches of an output selection ring connected upstream of the transmission sources of the transmission antenna, and, on the ground, a satellite access station GWt having a communication spectrum monitoring system CSM and a computer. The suppression method comprises a set of steps for testing the satellite accesses of the different stations GW, enabling each opposition matrix to be set selectively. The multi-spot space communication system incorporating the subsystem for suppressing the interference signals is described.

12 Claims, 13 Drawing Sheets

SYSTEM AND METHOD FOR SUPPRESSING UPLINK INTERFERENCE SIGNALS GENERATED IN A MULTI-SPOT SPACE COMMUNICATION SYSTEM

CROSS-REFERENCE TO RELATED APPLICATIONS

This application claims priority to foreign French patent application No. FR 2009687, filed on Sep. 24, 2020, the disclosure of which is incorporated by reference in its entirety.

FIELD OF THE INVENTION

The present invention relates to a space system and method for suppressing interference signals generated between satellite access stations that are geographically neighbouring and form part of a multi-spot space communication system.

BACKGROUND

In a multi-spot space transmission system, comprising a multi-spot transmission satellite, the satellite reception antenna of the uplink access channel of the satellite access stations must provide mutual isolation of more than 20 dB between the active satellite access stations or GWs ("gateways"), in order to avoid significant degradation of the performance of the space communication system in terms of C/I (ratio of the power of the useful signal to the total power of the interference signals) and minimize the effect on the link balance of the useful signal.

This high isolation constraint requires spatial separation on the ground between the satellite access stations (GWs) that is more than twice the diameter of the ground track of a beam, also called the spot.

This spatial separation on the ground between the access stations (GWs) cannot be maintained at all times, because the positions of the access stations (GWs) are chosen by telecommunication services operators on the basis of a number of criteria, including, notably, the presence or existence of an optical fibre link and high-speed network infrastructure, and the amount of rainfall at the station location sites.

Moreover, in their requirements for system specifications, telecommunication services operators, in practically all cases, show a high degree of flexibility and slowness in choosing the location of the satellite access stations (GWs) in the coverage, which may not be determined for several months after the launch of the programme. Because of the lack of knowledge of the exact geographical location of the access stations (GWs), it is impossible to allow for the isolation constraints during the phase of antenna performance optimization, and consequently there is a risk that everything will have to be redesigned when the final position of the access stations (GWs) is known.

To offer flexibility to telecommunication services operators in the late choice of geographical locations of access stations (GWs), a known solution, described in patent application WO 2017/009562 A1, uses a subsystem on board a satellite including an opposition matrix, frequency conversion chains and an on-board computer. This subsystem, added and installed downstream of the communication satellite reception antenna, is configured for calculating the opposition rule and applying said rule in the opposition matrix in order to suppress the interference signals present in the payload communication channels.

However, this solution has the following drawbacks:
high complexity and cost in terms of the number of additional space equipment, namely a computer and frequency conversion chains;
increased weight, power consumption and dissipation of the satellite payload, and of the satellite as a whole;
constraints on the arrangement of the payload within the satellite, due to the addition of these supplementary space devices.

SUMMARY OF THE INVENTION

The technical problem solved by the invention is that of providing a system and method for suppressing uplink interference signals generated between satellite access stations that are geographically neighboring and form part of a multi-spot space communication system, in which the complexity, cost, weight, consumption, dissipation and constraints on arrangement of the payload are reduced.

To this end, the invention proposes a method for suppressing uplink interference signals generated between satellite access stations that are geographically neighbouring and form part of a multi-spot space communication system, the multi-spot space communication system comprising:
a telecommunications satellite including an on-board multi-spot communication payload; and
a first set of a whole number N, greater than or equal to 2, of satellite access stations ($SAS_i$) that are geographically neighboring, i being a first whole number index varying from 1 to N; and
a second set of user terminals;
the multi-spot communication payload having a satellite reception antenna,
a satellite transmission antenna, and N repeater channels ($RC_i$), i varying from 1 to N, the satellite reception antenna being configured to receive, in an uplink channel in a reception frequency band, simultaneously and in parallel from N neighborinig reception spots ($NRS_i$), i varying from 1 to N, N different reception radio signals ($RRS_i$), transmitted by the $SAS_i$ respectively, each $SAS_i$ being located in a corresponding unique $NRS_i$, and each received $RRS_i$ being delivered by a unique ($RS_i$), i varying from 1 to N, corresponding to the $NRS_i$ and forming part of the reception antenna;
the satellite transmission antenna being configured to transmit in a downlink channel in a. transmission frequency band, simultaneously and in parallel towards N neighbouring transmission spots ($NTS_i$), i varying from 1 to N, N different transmission radio signals ($TRS_i$), i varying from 1 to N, supplied, respectively, to N transmission sources ($TS_i$), i varying from 1 to N, corresponding to the $NTS_i$ and forming part of the transmission antenna, each $NTS_i$ covering the corresponding $SAS_i$, having a coverage substantially identical to that of the corresponding $NRS_i$, and the $TRS_i$ being, respectively, the $RRS_i$, amplified and transposed, preferably reduced, uniformly in frequency;
each $RC_i$ being nominally contained between the $RS_i$ and the $TS_i$ having the same index value i and comprising, downstream of the $RS_i$, a reception amplifier ($RA_i$) and an RF divider ($RFD_i$) with one input and N outputs, and a frequency transposition converter, preferably a frequency reducer, ($FTC_i$), connected to an output of the $RFD_i$, the user terminals of the second set being distributed over the NTSi;

the method for suppressing interference signals generated between the SASi being characterized in that it comprises:

in a first phase before the launch of the satellite, a first step, in which, for a fixed predetermined whole number i0 chosen from among the whole numbers from 1 to N, an opposition matrix (OMi0) with N input rows Ri0, k, k varying from 1 to N and a single output terminal is installed permanently in the RCi0, the input row Ri0, i0 being a direct input row connected directly to an output of a divider (RFDi0), the N-1 remaining input row(s) Ri0j, j being an index varying from 1 to N and different from i0, being derived opposition rows of the OMi0, connected respectively to the corresponding RFDj at one of their outputs, and the single output terminal of the OMi0 being connected to the input terminal of a frequency transposition converter (FTCi0), the OMi0 comprising the input rows Ri0, i and a combiner (Ci0) with N inputs and one output, supplied at its input by the input rows Li0, k, k varying from 1 to N, and connected at its output to the output terminal of the OMi0, and each derived opposition input row Ri0, j, j varying from 1 to N and being different from i0, including a different remotely controllable attenuator/phaseshifter; then in a second phase, after the satellite has been launched and the SASi have been brought into service, a second step in which a TSt, t being a predetermined whole number between 1 and N, corresponding to the NTSt, covering the SASt which comprises a communication spectrum monitoring device, is selected, and in which the output terminal of the OMi0 is connected to the TSt and the remaining (TSs), s being an index varying from 1 to N and different from t, are disconnected from their associated RCs, while suitably configuring switches of an output selection ring (134), connected between output terminals of the RCi and the TSi of the transmission antenna, i varying from 1 to N; then a third step in which the corresponding reception source (RSi0) of a neighboring reception spot (NRSi0) covering a satellite access station (SASi0) is connected to the direct input row of the OMi0, and the remaining RSj, j varying from 1 to N and being different from i0, are disconnected from the N-1 derived opposition input rows Ri0, j of the OMi0; and then a fourth step in which the SASt, of rank t, receives a multiplex of test signals transmitted by the SASk, k varying from 1 to N, of the first set, and received by the RSi0 and retransmitted by the TSt, and digitizes said multiplex into a useful acquisition signal (UASi0). i0; then a fifth step in which, for each remaining RSj, the remaining RSj, corresponding to the NRSj covering the SASj, is connected to the derived opposition row Ri0, j of the OMi0, and the RSk, k varying from 1 to N and being different from j, are disconnected from the N-1 corresponding input rows Ri0, k of the OMi0; then the SASt receives a multiplex of test signals transmitted by the SASk, k varying from 1 to N, received by the RSj and retransmitted by the TSt, and digitizes said multiplex into an interference acquisition signal ACQi0 (IASi0), j; and then a sixth step in which the access station causes a computer for spectral monitoring of the received communication signals to calculate, for each IASi0, j, j varying from 1 to N and being different from i0, a first complex correlation coefficient between the UASi0, i0 and the IASi0, j, and causes the determination, on the basis of the first complex coefficient of values of attenuation and phase change of the opposition row Ri0, j allowing the rejection of the interference signal generated by SASj on the repeater reception access assigned to the SASi0; then a seventh step, in which the attenuators/phase shifters of the OMi0 are set by remote control to the values of attenuation and phase change determined in the sixth step (314; 414).

According to specific embodiments, the method for suppressing uplink interference signals comprises one or more of the following characteristics, considered separately or in combination:

during the first phase, the first step before the launch of the satellite consists in:

permanently installing in the RCi, for i varying from 1 to N, an opposition matrix (OMi) with N input rows Ri, k, k varying, from 1 to N, and a single output terminal, the input row Ri, i being a direct input row connected directly to an output of the RFDi, the N-1 remaining input row(s) Ri, j, j being a second index varying from 1 to N and being different from i, being derived opposition rows of the OMi, connected respectively to corresponding dividers (RFDj) at one of their outputs, and the single output terminal of the OMi being connected to the input terminal of the FTCi, the OMi comprising the input rows Ri, k and a combiner (Ci) with N inputs and one output, supplied at its input by the input rows Ri, k, k varying from 1 to N, and connected at its output to the output terminal of the OMi, and each derived opposition input row Ri, j, j varying from 1 to N and being different from i, including a different remotely controllable attenuator/phase shifter; then in a second phase, after the satellite (4) has been launched and the satellite access stations have been brought into service, for i varying from 1 to N, the second step consists in selecting the TSt, t being a predetermined whole number between 1 and N, corresponding to the NTSt, covering the SASt which comprises a communication spectrum monitoring device, and in connecting the output terminal of the OMi to the selected TSt, and disconnecting the remaining TSs, s being an index varying from 1 to N and different from t, from their associated RCs. by suitably configuring the switches of the output selection ring (134) connected between output terminals of the RCi and the TSi of the transmission antenna (24);

the third step consists in connecting the RSi, corresponding to the NRSi covering the SASi, to the direct input row of the OMi, and in disconnecting the RSj, j varying from 1 to N and being different from i, from the N-1 derived opposition input rows Ri, j of the OMi;

the fourth step consists in that the SASt, of rank t, receives a multiplex of test signals transmitted by the SASk, k varying from 1 to N, of the first set, and received by the RSi and retransmitted by the TSt, and digitizes said multiplex into a useful acquisition signal (UASi), i; then the fifth step consists, for each remaining RSj, j varying from 1 to N and being different from i, in connecting the remaining RSj, corresponding to the NRSj covering the SASj, to the derived opposition row Ri, j of the OMi, and disconnecting the RSk, k varying from 1 to N and being different from j, from the N-1 corresponding input rows Ri, k of the OMi; then in that the SASt receives a multiplex of test signals transmitted by the SASk, k varying from 1 to N, received by the RSj and retransmitted by the TSt, and digitizes said multiplex into an interference acquisition signal (IASi), j;

a sixth step consists in that the SASt causes its computer for spectral monitoring of the communication signals to calculate, for each IASi, j, j varying from 1 to N and being different from i, a second complex correlation coefficient between the UASi, i and the IASi, j, and causes the determination, on the basis of the second complex correlation coefficient of values of attenuation and phase change of the opposition row Ri, j allowing the rejection of the interference signal generated by the SASj on the repeater reception access assigned to the SASi;

the seventh step consists in that the attenuators/phase shifters of the OMi are set by remote control to the values of attenuation and phase change determined in the sixth step, the number N of neighbouring satellite access stations is equal to 2 or 3;

the positions of the switches of the input switching set, the positions of the switches of the output switching ring, and the settings of the attenuators and the phase shifters of the derived opposition rows are executed on the basis of the sending of remote controls sent by a remote control and measurement station, integrated on the same site as the SASt, or positioned separately on a site other than that of the SASt and connected to the SASt by a terrestrial infrastructure.

The waveform of the test signals transmitted by the satellite access stations is a wide-band white noise, or a comb structure of lines, or representative communication signals of the service.

The method according to the invention comprises a third phase of implementing the communication service and an eighth step in which for i varying from 1 to N, each reception source SRi of the multi-spot reception antenna is connected to the corresponding transmission source SEi of the transmission antenna through the associated repeater channel VRi, by positioning the switches of the input switching set and the switches of the output ring so as to obtain this configuration of interconnection of the sources to each other, the opposition matrix MATi0 or the opposition matrix MATi having been set in the first phase and the second phase so as to suppress the interference created by the neighbouring satellite access stations GWj of the access station GWi0.

The invention also proposes a multi-spot space system for suppressing the uplink interference signals generated between geographically neighbouring satellite access stations, comprising:

a telecommunications satellite including an on-board multi-spot communication payload; and a first set of a whole number N, greater than or equal to 2, of satellite access stations GWi, i being a first whole number index varying from 1 to N, that are geographically neighbouring so that they create interference with each other on at least one satellite access; and a second set of user terminals;

the multi-spot communication payload having one or more satellite reception antennae, a satellite transmission antenna, and N repeater channels VRi, i varying from 1 to N, the satellite reception antenna or antennas being configured to receive, in an uplink channel in a reception frequency band, simultaneously and in parallel from N neighbouring reception spots SPRi, i varying from 1 to N, N different reception radio signals SRi, transmitted by the satellite access stations GWi respectively, each satellite access station GWi, i varying from 1 to N, being located in a corresponding unique reception spot SPRi, and each radio signal SRi, i varying from 1 to N, being delivered by a unique source SRRi corresponding to the reception spot SPRi of the reception antenna;

the satellite transmission antenna being configured to transmit in a downlink channel in a transmission frequency band, simultaneously and in parallel towards N neighbouring transmission spots SPEi, i varying from 1 to N, the N radio signals received, amplified and uniformly frequency transposed, Sid, each transmission spot SPEi, i varying from 1 to N, covering the corresponding satellite access station GWi, having a coverage substantially identical to that of the reception spot SPRi; each repeater channel VRi, i varying from 1 to N, being nominally between the reception source SRRi and the transmission source SREi having the same index value i and comprising, downstream of the reception source SRRi, a reception amplifier LNAi and an RF divider DIVi with one input and N outputs, and a transposition frequency converter and reducer, preferably a frequency reducer, DWNi, connected to an output of the RF divider DIVi, the user terminals of the second set being distributed over the N transmission spots SPEi, i varying from 1 to N;

the multi-spot space communication system being characterized in that:

a satellite access station GWt, t being a predetermined whole number between 1 and N, corresponding to the satellite transmission spot SPEt, which covers it, comprises a communication spectrum monitoring device CSM; and the payload comprises switches of an input switch assembly, connected between input terminals of repeater channels and the reception sources of the reception antenna, and switches of an output selection ring, connected between output terminals of the repeater channels VRi and the transmission sources SREi of the transmission antenna; and the payload comprises at least one opposition matrix MATi0, i0 being a fixed predetermined whole number between 1 and N, with N input rows Li0, k, k varying from 1 to N, and a single output terminal, the input row Li0, i0 being a direct input row connected directly to an output of the divider DIVi0, the N−1 remaining input row(s) Li0 j, j being an index varying from 1 to N and being different from i0, being derived opposition rows of the opposition matrix MATi0, connected respectively to the corresponding divider(s) DIVj at one of their outputs, and the single output terminal of the opposition matrix MATi0 being connected to the input terminal of the frequency transposition converter DWNi0, the opposition matrix MATi0 comprising the input rows Li0, i and a combiner COMi0 with N inputs and one output, supplied at its input by the input rows Li0, k, k varying from 1 to N, and connected at its output to the output terminal of the opposition matrix, and each derived opposition input row Li0, j, j varying from 1 to N and being different from i0, including a different remotely controllable attenuator/phase shifter.

According to specific embodiments, the relay platform comprises one or more of the following characteristics, considered separately or in combination:

the payload is configured for, in a second phase after the satellite has been launched and the satellite access stations have been brought into service:

in a second step, selecting the transmission source SREt, corresponding to the satellite transmission spot SPEt, connecting the output terminal of the opposition matrix MATi0 to the selected transmission source SREt, and disconnecting the remaining transmission sources SREs, s being an index varying from 1 to N and different from t, by suitably configuring the switches of the output selection ring;

in a third step, connecting the corresponding reception source SRRi0 of the reception spot SRi0 to the direct input row of the opposition matrix MATi0, and disconnecting the reception sources SRRj, j varying from 1 to N and being different from i0, from the N−1 derived opposition input rows Li0, j of the opposition matrix MATi0;

the satellite access station GWt, of rank t, is configured for, in a fourth step, receiving a multiplex of test signals transmitted by the satellite access stations GWk, k varying from 1 to N, of the first set, received by the reception source SRRI0 and then retransmitted by the transmission source SREt, and digitizing said multiplex into a useful acquisition signal ACQi0, i0;

the payload is configured for, in a fifth step, connecting each remaining reception source SRRj, j varying from 1 to N and being different from i0, corresponding to the reception spot SRj covering the satellite access station GWj, to the derived opposition row Li0, j of the opposition matrix MATi0, and disconnecting the reception sources SRRk, k varying from 1 to N and being different from j, from the N−1 corresponding input rows Li0, k of the opposition matrix MATi0; and the satellite access station GWt is configured for, subsequently, in the same fifth step, receiving a multiplex of test signals transmitted by the satellite access stations GWk, k varying from 1 to N, received by the reception source SRRi0 and retransmitted by the transmission source SREt, and digitizing said multiplex into an interference acquisition signal ACQi0, j, and, in a sixth step, causing the computer for spectral monitoring of the received communication signals to calculate, for each interference acquisition signal ACQi0, j, j varying from 1 to N and being different from i0, a complex correlation coefficient Ci0, j between the useful acquisition signal ACQi0, i0 and the interference acquisition signal ACQi0, j, and causing the determination, on the basis of the complex coefficient Ci0, j, of values of attenuation and phase change of the opposition row Li0, j allowing the rejection of the interference signal generated by GWj on the repeater reception access assigned to the access station GWi0;

the payload is configured for, in a seventh step, setting the attenuators/phase shifters of the opposition matrix MATi0 by remote control to the values of attenuation and phase change determined in the sixth step.

the payload comprises N opposition matrices MATi, i varying from 1 to N, with N input rows Li, k, k varying from 1 to N, and a single output terminal, the input row Li, i being a direct input row connected directly to an output of the divider DIVi, the N−1 remaining input row(s) Li, j, j being a second index varying from 1 to N and different from i, being derived opposition rows of the opposition matrix MATi, connected respectively to the corresponding divider(s) DIVj at one of their outputs, and the single output terminal of the opposition matrix MATi being connected to the input terminal of the frequency transposition converter DWNi0, the opposition matrix MATi comprising the input rows Li, k and a combiner COMi with N inputs and one output, supplied at its input by the input rows Li, k, k varying from 1 to N, and connected at its output to the output terminal of the opposition matrix MATi, and each derived opposition input row Li, j, j varying from 1 to N and being different from i, including a different remotely controllable attenuator/phase shifter; and the payload is configured for, after the satellite has been launched and the satellite access stations have been brought into service, for i varying from 1 to N, in a second step, selecting the transmission source SREt, t being a predetermined whole number between 1 and N, corresponding to the satellite transmission spot SPEt, covering the satellite access station GWt which comprises a communication spectrum monitoring device, and connecting the output terminal of the opposition matrix MATi to the selected transmission source SREt, and disconnecting the remaining transmission sources SEs, s being an index varying from 1 to N and different from t, by suitably configuring the switches of the output switching ring connected between output terminals of the repeater channels and the transmission sources of the transmission antenna;

in a third step, connecting the reception source SRRi, corresponding to the reception spot SRi covering the satellite access station GWi, to the direct input row of the opposition matrix MATi, and disconnecting the reception sources SRRj, j varying from 1 to N and being different from i, from the N−1 derived opposition input rows Li, j of the opposition matrix MATi;

in a fifth step, after a fourth step in which the satellite access station GWt, of rank t, receives a multiplex of test signals transmitted by the satellite access stations GWk, k varying from 1 to N, of the first set, and received by the reception source SRRi and retransmitted by the transmission source SEt, and digitizes said multiplex into a useful acquisition signal ACQi, i, for each remaining reception source SRRj, j varying from 1 to N and being different from i, connecting the remaining reception source SRRj, corresponding to the reception spot SRj covering the satellite access station GWj, to the derived opposition row Li, j of the opposition matrix MATi, and disconnecting the reception sources SRRk, k varying from 1 to N and being different from j, from the N−1 corresponding input rows Li, k of the opposition matrix MATi.

the satellite access station GWt is configured for:

in the fifth step, receiving a multiplex of test signals transmitted by the satellite access stations GWk, k varying from 1 to N, received by the reception source SRRi and retransmitted by the transmission source SEt, and digitizes said multiplex into an interference acquisition signal ACQi, j; and in a sixth step, causing its computer for spectral monitoring of the received communication signals to calculate, for each interference acquisition signal ACQi, j, j varying from 1 to N and being different from i, a complex correlation coefficient Ci, j between the useful acquisition signal ACQi, i and the interference acquisition signal ACQi, j, and determining, on the basis of the complex coefficient Ci, j, values of attenuation and phase change of the opposition row Li, j allowing the rejection of the interference signal generated by the station GWj on the repeater reception access assigned to the access station GWi; and the payload is configured so that, in a seventh step, the attenuators/phase shifters of the opposition matrix MATi are set by remote control to the values of attenuation and phase change determined in the sixth step.

the number N of neighbouring satellite access stations is greater than or equal to 2 and less than or equal to 8, the positions of the switches of the input switching set, the positions of the switches of the output switching ring, and the settings of the attenuators and the phase shifters of the derived opposition rows are executed on the basis of the sending of remote controls sent by a remote control and measurement station, integrated on the same site as the satellite access station GWt, or positioned separately on a site other than that of the access station GWt and connected to said station GWt by one or more communication links with or without the use of a terrestrial infrastructure.

BRIEF DESCRIPTION OF THE DRAWINGS

The invention will be more clearly understood with the aid of the following description of a number of embodiments, which is provided solely by way of example and which refers to the figures, of which.

DETAILED DESCRIPTION

In order to provide the required degree of isolation between the satellite access stations GWs for spacings considerably smaller than twice the diameter of a spot (corresponding to a beam), a multi-spot space communication system according to the invention is configured for suppressing the uplink interference signals, by implementing a suppression subsystem distributed on an on-board and ground basis between the on-board segment, that is to say the satellite and its payload, and the ground segment, that is to say the satellite access stations, the basic principle of the invention being that of calculating a beam formation rule providing for the creation of one or more "holes" or "fades" in gain in the direction of one or more interference signals.

The suppression subsystem according to the invention is based, on the one hand, on the known use within the payload of one or more opposition matrices, each being composed of attenuators, phase shifters and couplers, enabling additional rejection to be provided.

On the other hand, the suppression subsystem according to the invention is based on the implementation of a method for calculation of the opposition rule on the ground, this rule being applied subsequently in the opposition matrix or matrices, and being enabled by the appropriate use of switches at the input and output of the repeater for directing the useful and interference signals to an access station GW, containing a communication spectrum monitor CSM. The monitor CSM enables the received signals to be digitized, and digital processing is applied, with the aid of a computer, to the digitized signals in order to extract an opposition rule (amplitude/phase) and thus allow the cancellation of the interference signals present in the reception channel of the repeater through which the useful signal of the access station GW passes. The processing is repeated for all active satellite access stations GWs of the multi-spot space communication system. A remote control signal TC containing the amplitude/phase commands for each access station GW is then sent to the satellite to configure the payload and thus provide the desired additional rejection for each GW of the system.

Figure 1:
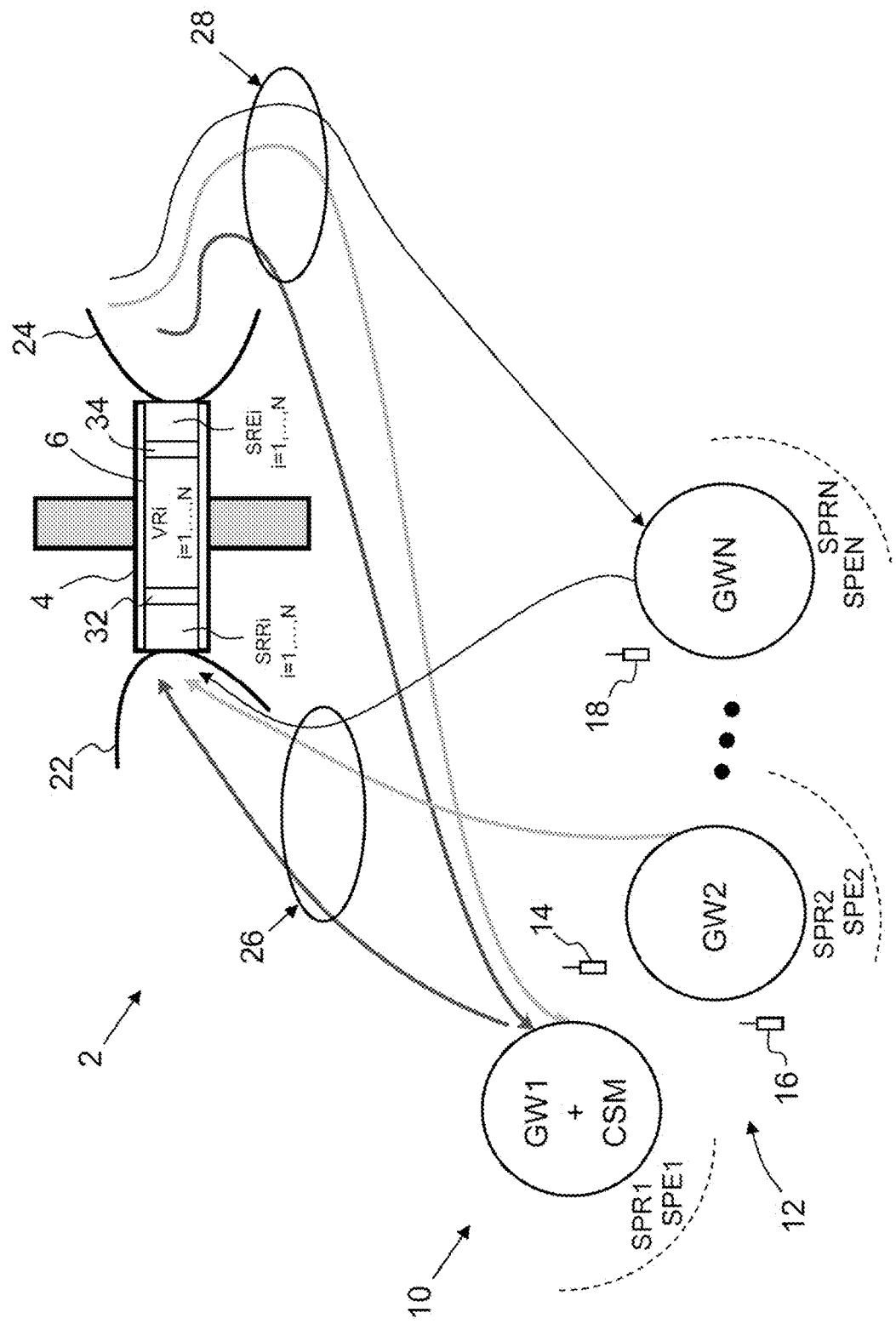
FIG. 1 is a view of the general architecture of a multi-spot space system according to the invention for suppressing the interference signals generated between satellite access stations and including a distributed on-board and ground subsystem for suppressing said interference signals.

According to FIG. 1, a multi-spot space communication system 2 is configured for suppressing the uplink interference signals generated between geographically neighbouring satellite access stations.

The space system comprises:

a telecommunications satellite 4 including an on-board multi-spot communication payload 6;

a first set 10 of a whole number N, greater than or equal to 2, of satellite access stations GWi, i being a first whole number index varying from 1 to N, the stations being geographically neighbouring so that interference is created among them in at least one satellite access; and a second set 12 of user terminals 14, 16, 18.

The multi-spot communication payload 6 comprises a satellite reception antenna 22, a satellite transmission antenna 24, and N repeater channels VRi, i varying from 1 to N.

The satellite reception antenna 22 is configured to receive, in an uplink channel 26 in the same reception frequency band, simultaneously and in parallel from N neighbouring reception spots SPRi, i varying from 1 to N, N different reception radio signals SRi, transmitted by the satellite access stations GWi respectively, each satellite access station GWi, i varying from 1 to N, being located in a corresponding unique reception spot SPRi, and each received radio signal SRi, i varying from 1 to N, being delivered by a unique source SRRi corresponding to the reception spot SPRi of the reception antenna 22.

The satellite transmission antenna 24 is configured to transmit in a downlink channel 28 in the same transmission frequency band, simultaneously and in parallel towards N neighbouring transmission spots SPEi, i varying from 1 to N, the N radio signals received, amplified and uniformly frequency reduced, Sid, each transmission spot SPEi, i varying from 1 to N, covering the corresponding satellite access station GWi, having a coverage substantially identical to that of the reception spot SPRi.

Each repeater channel VRi, i varying from 1 to N, is nominally contained between the reception source SRRi and the transmission source SREi having the same index value i and comprising, downstream of the reception source SRRi and not shown in FIG. 1, a reception amplifier LNAi and an RF divider DIVi with one input and N outputs, and a frequency transposition converter, preferably a frequency reducer, DWNi, connected to an output of the RF divider DIVi.

The user terminals 14, 16, 18 of the second set 12 are distributed in the N reception spots SPRi, i varying from 1 to N.

At least one satellite access station GWt, t being a predetermined whole number between 1 and N, corresponding to the satellite transmission spot SPEt, which covers it, comprises a communication spectrum monitoring or surveillance device CSM. Here and by way of example in FIG. 1, this is the satellite access station GW1.

The payload 6 comprises switches of an input switch assembly 32, connected between input accesses of repeater channels and the reception sources SRRi, i varying from 1 to N, of the reception antenna 22, and switches of an output selection ring 34, connected between output accesses of the repeater channels and the transmission sources SREi of the transmission antenna 24.

Figure 2:
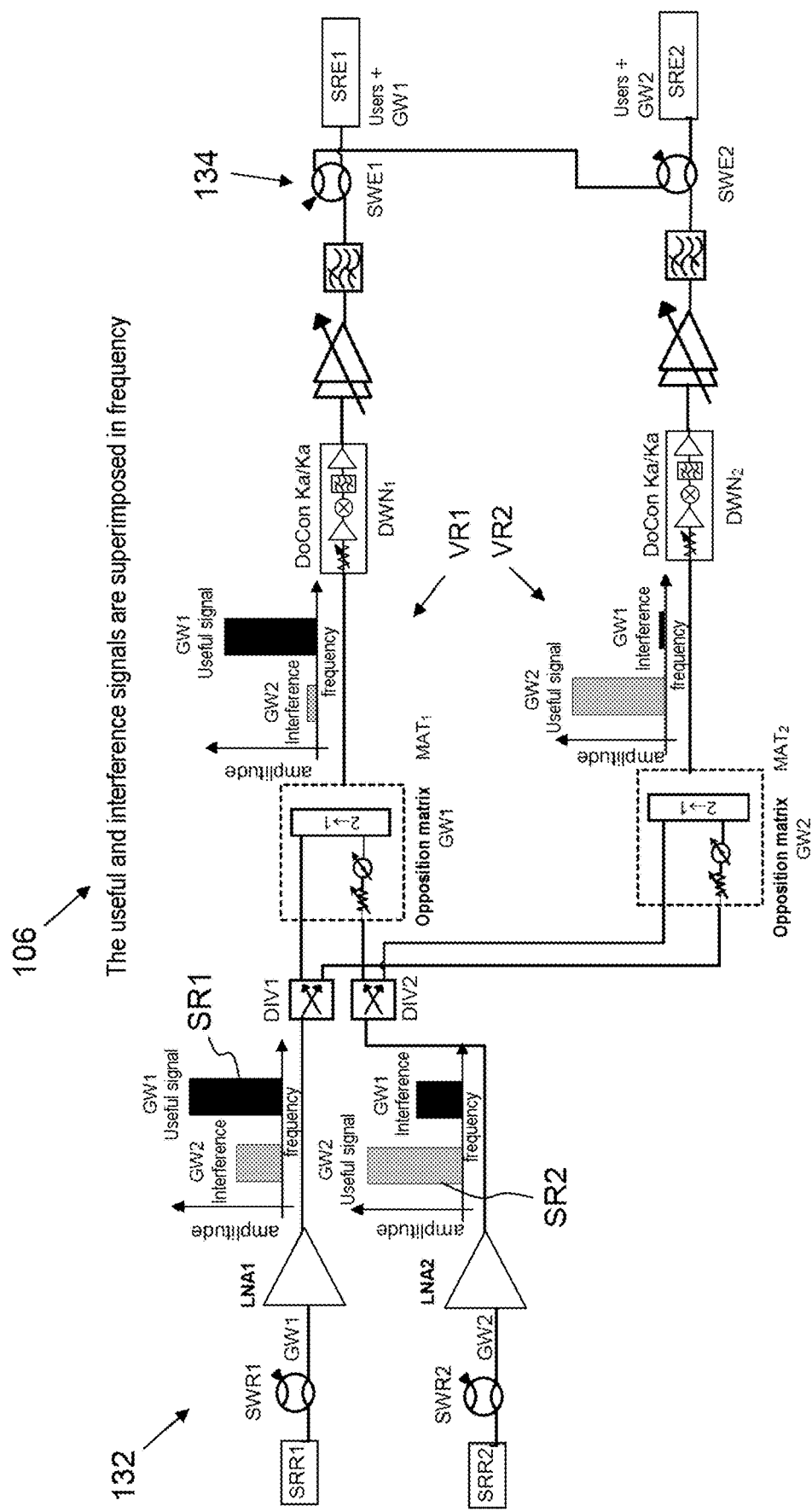
FIG. 2 is a view of the architecture of a first embodiment of a payload of a multi-spot communication satellite according to the invention with two reception channels, in which the useful and interference signals are separated in frequency, corresponding to an operational case for ease of understanding.
Figure 3:
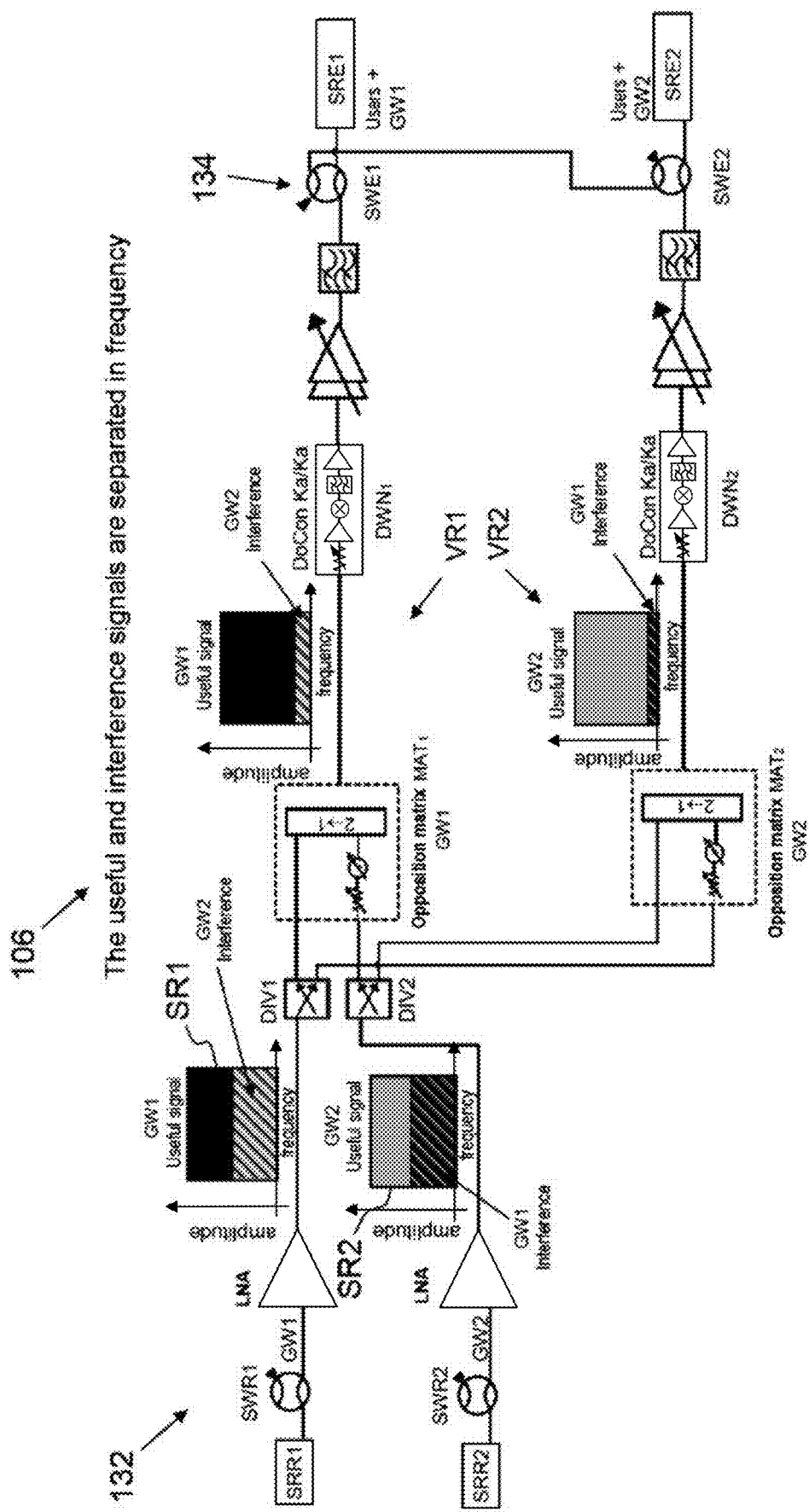
FIG. 3 is a view of the architecture of the first embodiment of the payload according to the invention of FIG. 2 in a variant in which the useful and interference signals are superimposed in frequency, corresponding to the most common operational case.

According to FIGS. 2 and 3, the multi-spot communication payload, denoted by the reference numeral 106, comprises two repeater channels VR1 and VR2, corresponding respectively to the passage of the useful signal SR1 received from the access station GW1 and that of the useful signal SR2 from the access station GW2.

Each repeater channel VRi, i varying from 1 to N, is nominally contained between the reception source SRRi and the transmission source SREi having the same index value i and comprising, downstream of the reception source SRRi, a reception amplifier ARi and an RF divider DIVi with one input and a number NSDIVi of outputs greater than or equal to 2 and less than or equal to N, and a frequency transposition converter, preferably a frequency reducer, DWNi, connected to an output of the RF divider DIVi.

The payload 106 here comprises, for i varying from 1 to 2, an opposition matrix MATi with two input rows Li, k, k varying from 1 to 2, and a single output terminal, the input row Li, i being a direct input row connected directly to an output of the divider DIVi, the remaining input row Li, j, j being an index varying from 1 to 2 and different from i, being the derived opposition row of the opposition matrix MATi, connected respectively to the corresponding divider DIVj at one of its outputs, and the single output terminal of the opposition matrix MATi being connected to the input terminal of the frequency transposition converter, preferably a frequency reducer, DWNi. The opposition matrix MATi comprises the two input rows Li, k, k varying from 1 to 2, and a combiner COMi with two inputs and one output, supplied at its input by the input rows Li, k, k varying from 1 to 2, and connected at its output to the output terminal of the opposition matrix MATi, and each derived opposition input row Li, j, j varying from 1 to 2 and being different from i, includes a different remotely controllable attenuator/phase shifter.

The payload 106 comprises two switches SWRi, i varying from 1 to 2, of an input switch assembly 132, connected between input terminals of repeater channels and the two reception sources SRRi, i varying from 1 to 2, of the reception antenna 22, here upstream of the two low-noise reception amplifiers LNA1 and LNA2, and switches SWEi of an output selection ring 134, connected between output terminals of the repeater channels VRi and the transmission sources SREi of the transmission antenna 24, i varying from 1 to 2.

Figure 4:
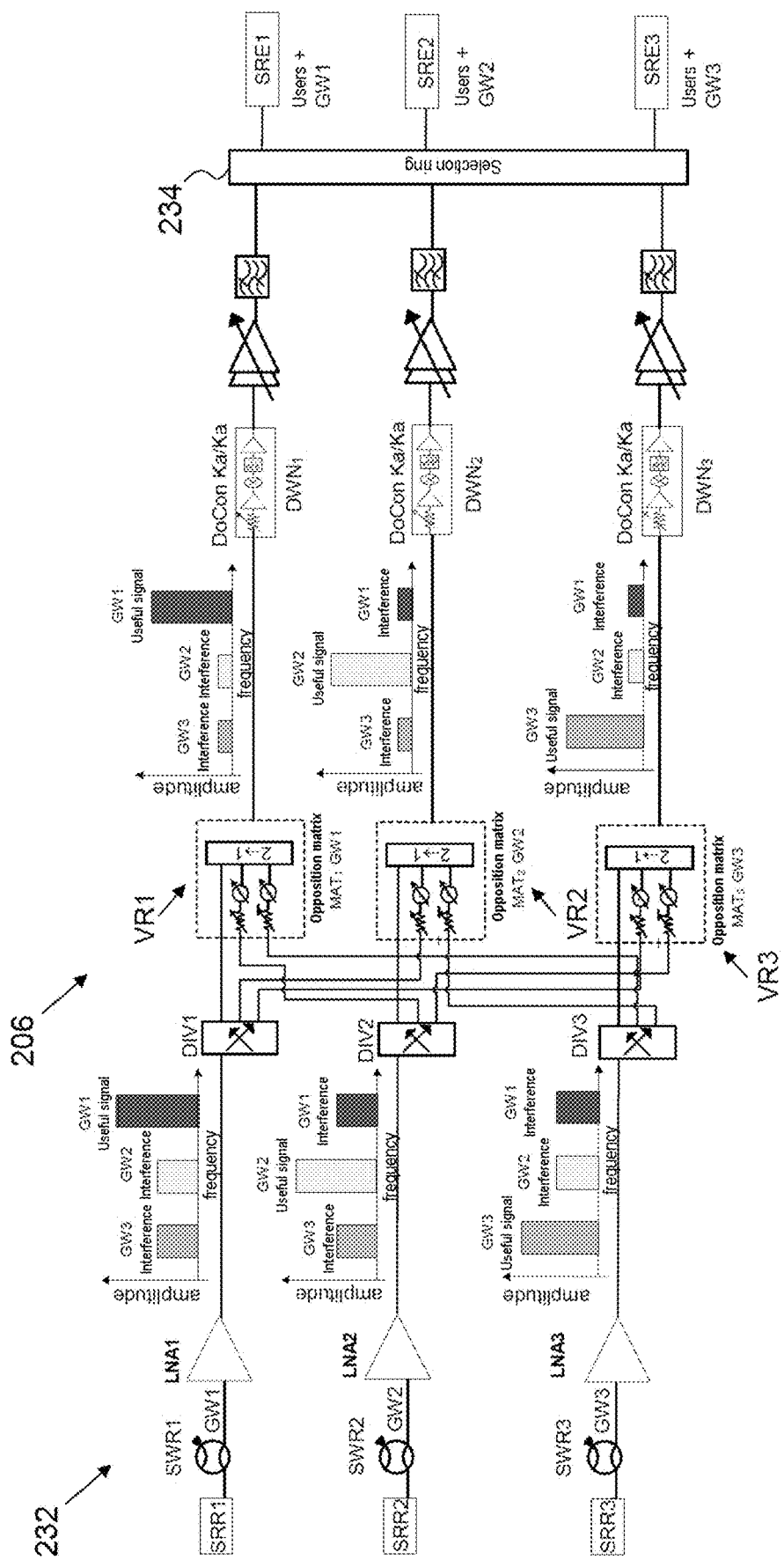
FIG. 4 is a view of the architecture of a second embodiment of a payload of a multi-spot communication satellite according to the invention with three reception channels, which is a generalization of the two-channel architecture of FIGS. 2 and 3, the payload being capable of receiving the signals of three access stations GWs with, for each communication channel, the processing of a useful signal from an access station and of two interference signals corresponding to the remaining two access stations.

According to FIG. 4, the multi-spot communication payload, denoted by the reference numeral 206, comprises three repeater channels VR1, VR2 and VR3, corresponding respectively to the passage of the useful signal received from the access station GW1, that of the useful signal received from the access station GW2 and that of the useful signal received from the access station GW3.

Each repeater channel VRi, i varying from 1 to 3, is nominally contained between the reception source SRRi and the transmission source SREi having the same index value i and comprising, downstream of the reception source SRRi, a reception amplifier LNAi and an RF divider DIVi with one input and a number NSDIVi of outputs equal to 3, and a frequency transposition converter, preferably a frequency reducer, DWNi, connected to an output of the RF divider DIVi.

The payload 206 here comprises, for i varying from 1 to 3, an opposition matrix MATi with three input rows Li, k, k varying from 1 to 3, and a single output terminal, the input row Li, i being a direct input row connected directly to an output of the divider DIVi, the remaining input row or two remaining input rows Li, j, j being an index varying from 1 to 3 and different from i, being derived opposition rows of the opposition matrix MATi, connected respectively to the corresponding divider(s) DIVj at one of their outputs, and the single output terminal of the opposition matrix MATi being connected to the input terminal of the frequency converter and reducer DWNi. The opposition matrix MATi, i varying from 1 to 3, comprises the three input rows Li, k, k varying from 1 to 3, and a combiner COMi with three inputs and one output, supplied at its input by the input rows Li, k, k varying from 1 to 3, and connected at its output to the output terminal of the opposition matrix MATi, and each derived opposition input row Li, j, j varying from 1 to N and being different from i, includes a different remotely controllable attenuator/phase shifter.

The payload 206 comprises three input switches SWRi, i varying from 1 to 3, of an input switch assembly 232, connected between input terminals of repeater channels VRi and the three reception sources SRRi, i varying from 1 to 3, of the reception antenna 22, here upstream of the three low-noise reception amplifiers LNA1, LNA2 and LNA3, and output switches SWEi of an output selection ring 234, connected between output terminals of the repeater channels VRi and the transmission sources SREi of the transmission antenna 24, i varying from 1 to 3.

The interference signals are suppressed with the aid of the dividers, the attenuators/phase shifters and adders of the opposition matrices, and the switches of the input switch assembly and of the output selection ring, appropriately set to allow the calculation on the ground of the interference suppression rule.

By means of the input and output switches, all the signals that are to be processed can be isolated and retrieved at the ground level in the same access station, in this case the station GW1.

Figure 5:
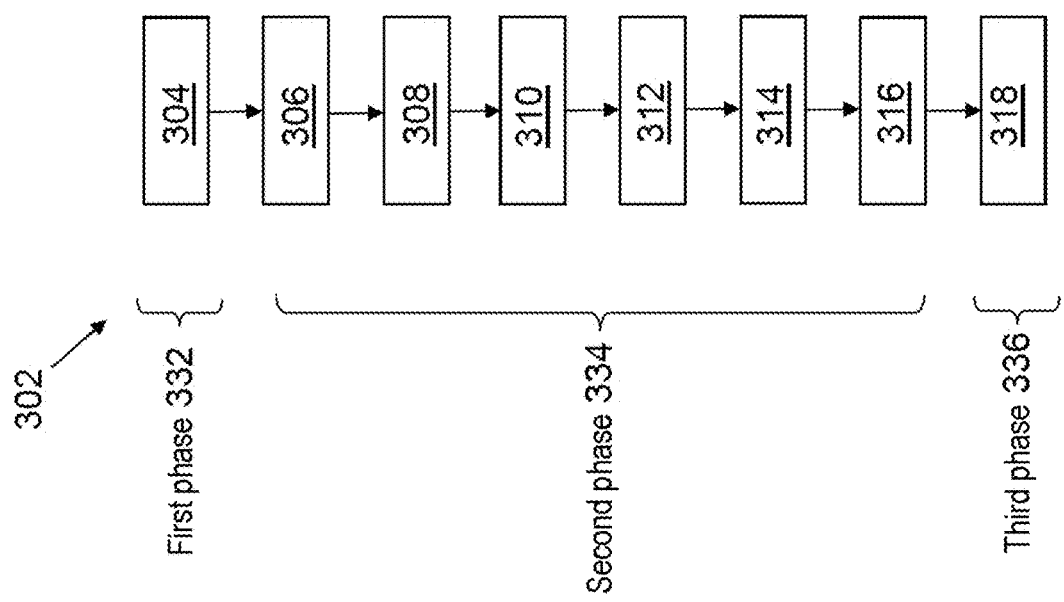
FIG. 5 is a flow chart of a method according to the invention for suppressing an interference signal of a communication channel of the payload of FIG. 2 or FIG. 3.

According to FIG. 5, a method 302 according to the invention for suppressing uplink interference signals generated between two geographically neighbouring satellite access stations GW1 and GW2 implements a calculation of the rule for beam formation on the ground, using the communication spectrum monitoring device CSM, implemented in the access station GW1 as described in FIG. 1, and the payload 106 according to the architecture described in FIGS. 2 and 3.

The method for suppressing the interference signals 302 comprises a set of steps 304, 306, 308, 310, 312, 314, 316, 318 executed sequentially.

The implementation of the method for suppressing interference signals 302, for suppressing the interference signal present on a chosen useful access GWi0, i0 being between 1 and 2, is carried out in three successive phases, namely a first phase 332 executed before the satellite is launched and the access stations GW1 and GW2 are brought into service, a second phase 334 of determining the setting parameters of the opposition matrix MATi0 of the chosen useful access GWi0, rank i0, and a third phase 336 of bringing the communications system into service with the opposition matrix or matrices set.

In a first case, where the setting of the first matrix MAT1 to the access of the first station GW1 is required, the first access station GW1 is referred to as "useful" and the second access station GW2 is referred to as "interfering".

In this first case, the aim will be to reject, or even cancel, the interference signal from GW2 present on the satellite access of the station GW1, that is to say the reception antenna source SRR1 and the repeater channel VR1.

The first step 304, executed during the first phase 332, corresponds to the provision of the payload of the satellite as described in FIGS. 2 and 3, and, in particular, to the installation of the opposition matrix MAT1 of the repeater channel VR1 of the payload.

Figure 6:
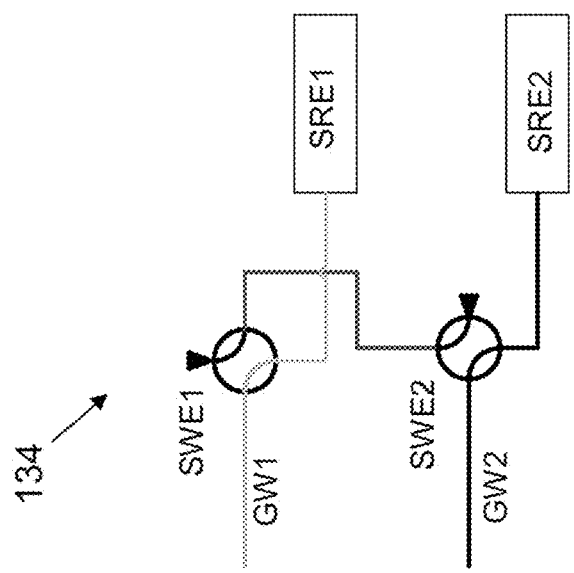
FIG. 6 is a view of the configuration of the output switches of the selection ring, formed in the second step of the suppression method according to the invention of FIG. 5, in the case where the setting of the first opposition matrix is to be found.

In the second step 306, which is part of the second phase 334, the output switches SWE1 and SWE2 of the selection ring 134 are configured, as shown in FIG. 6, for connecting the repeater channel VR1 to the transmission source SRE1 and the repeater channel VR2 to the transmission source SRE2.

Figure 7:
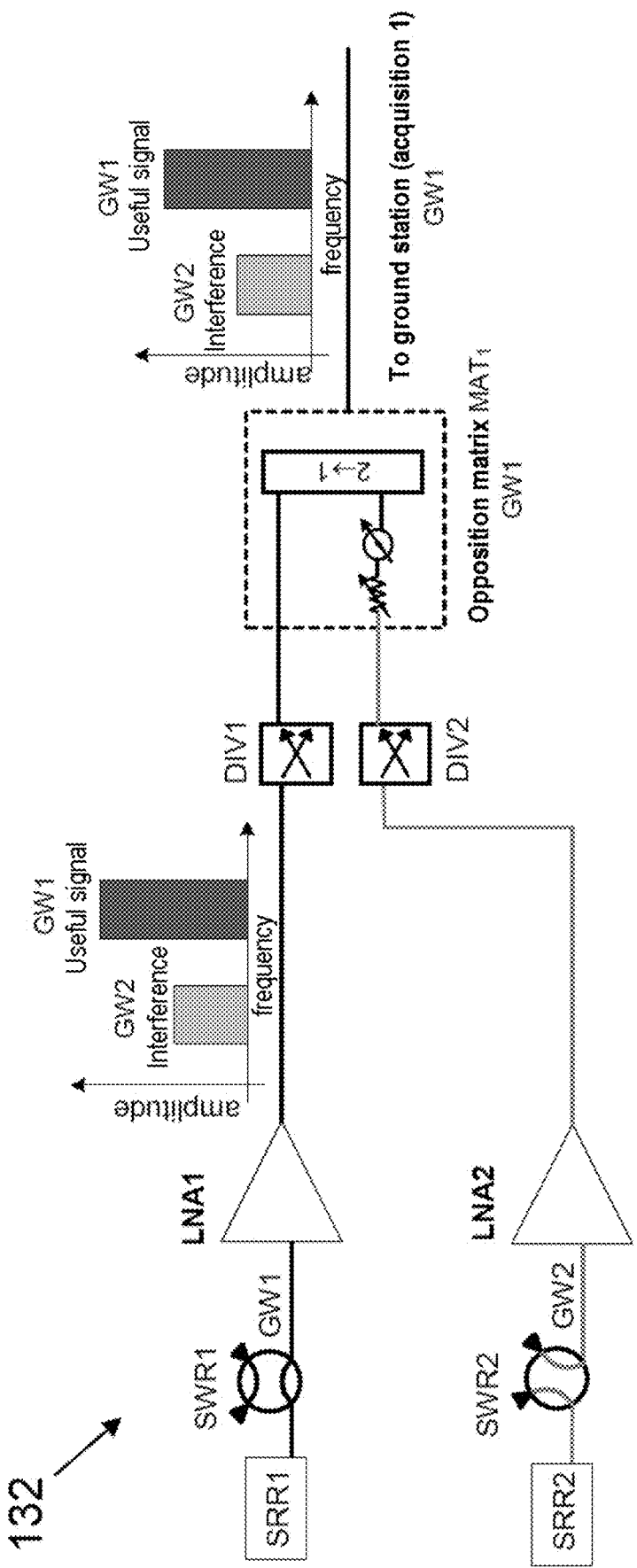
FIG. 7 is a view of the configuration of the input switches of the input switch assembly, together with a view of the levels of the useful and interference signals at the input and output of the first opposition matrix of the access of the first access station GW1 after the execution of the third and fourth steps of the method for suppressing the interference signal of FIG. 5.

In the third step 308, which is part of the second phase 334, the input switch SWR2 of the access GW2 of VR2 is switched to the OFF position, and the input switch of the access GW1 is switched to the ON position, as shown in FIG. 7. In this third step 308, only the multiplex of signals received on the source SRR1 of GW1 is transmitted to the ground to be digitized.

In the fourth step 310, the satellite access station GW1 receives the multiplex of test signals transmitted by the useful access station GW1 and the interfering access station GW2 and received by the reception source SRR1 and retransmitted by the transmission source SRE1, and digitizes said multiplex into a first useful acquisition signal ACQ1,1.

Figure 8:
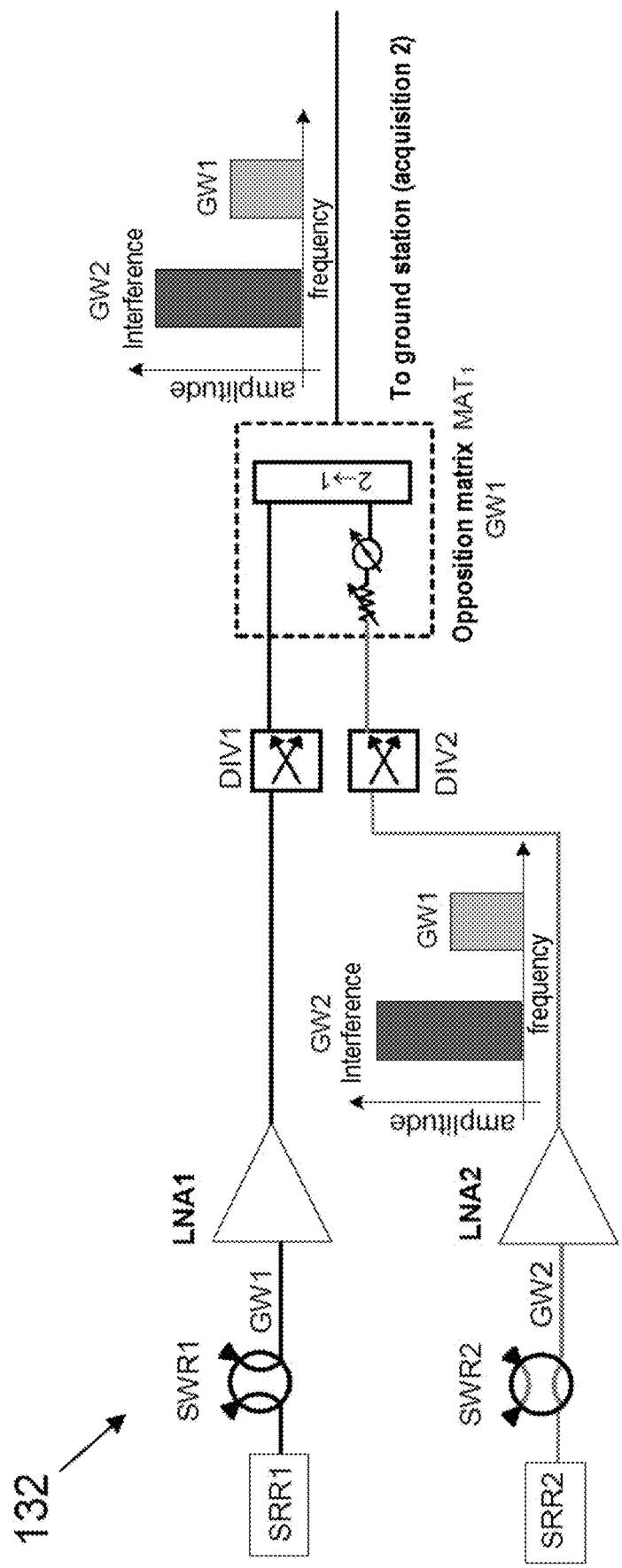
FIG. 8 is a view of the configuration of the input switches of the input switch assembly, together with a view of the levels of the useful and interference signals at the input and output of the first opposition matrix of the communication channel corresponding to the first access station GW1 after the execution of the fifth step of the method for suppressing the interference signal of FIG. 5.

Then, in the fifth step 312, which is part of the second phase 334, the input switch SWR2 of the access GW2 is switched to the ON position, and the switch of the access GW1 is switched to the OFF position, as shown in FIG. 8. In this fifth step 312, only the multiplex of signals received on the reception source SRR2 of the second access station GW2 is transmitted to the ground to be digitized. The access station GW1 receives the multiplex of test signals transmitted by the access stations GW1 and GW2, received on the reception source SRR2 and retransmitted by the transmission source SRE1, and digitizes said multiplex into a second interference acquisition signal ACQ1,2.

Then, in the sixth step 314, which is part of the second phase 334, a complex coefficient C1,2 is calculated on the ground by correlation between the two acquisition signals, making it possible to reject the interference signal from GW2 present on the access of the first access station GW1.

Then, in the seventh step 316, which is part of the second phase 334, the ground access station GW1 sends a remote control signal TC for configuring the attenuator/phase shifter of the opposition matrix MAT1 of the access station GW1.

Then, in the eighth step 318, which is part of the third phase 336, the ground access station GW1 sends a remote control signal TC for setting the input switches SWR1, SWR2 of the input switch assembly 132 to the ON position and the output switches of the selection ring 134 to the positions of the operational communication service, as shown in FIGS. 2 and 3.

The opposition matrix MAT1, when set in this way, enables a vector summation to be performed between the signal from the first access station GW1 and that from the second access station GW2. The complex coefficient calculated in the sixth step 314 enables the interference signal present on the access SRR1 (i.e. that corresponding to the access station GW2) to be summed in opposition with its replica obtained from the access SRR2.

Figure 9:
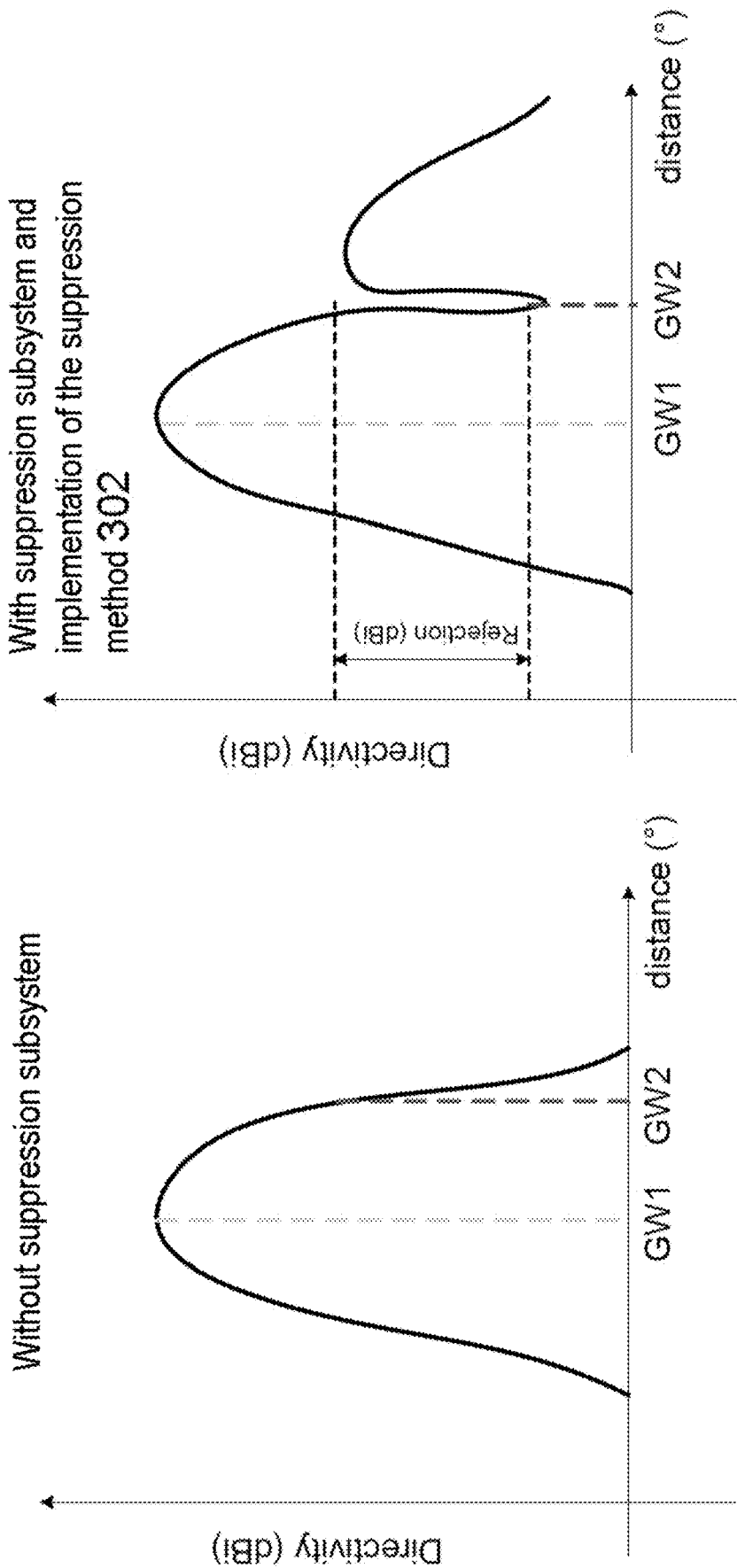
FIG. 9 is a view of the effect of the suppression method after the implementation of the sixth and seventh steps of the method for suppressing the interference signal of FIG. 5.

The interference signal from GW2 on the access SRR1 of the first station GW1 is now sufficiently rejected to reach the C/I ratio of the power of the useful signal to the power of the interference signal required by the multi-spot communication system, as shown in FIG. 9.

In a second case, where the setting of the second opposition matrix MAT2 to the access of the second station GW2 is required, the second access station GW2 is referred to as "useful" and the first access station GW1 is referred to as "interfering".

In this second case, the aim will be to reject, or even cancel, the interference signal from GW1 present on the satellite access of the station GW2, that is to say the reception antenna source SRR2 and the repeater channel VR2.

In a similar manner to the first case, the method 302 for suppressing the interference signals described in FIG. 5 is applied.

In this second case, the implementation of the first step 304, executed during the first phase 332, comprises the installation of the opposition matrix MAT2 of the repeater channel VR2 of the payload 106, as described in FIGS. 2 and 3.

Figure 10:
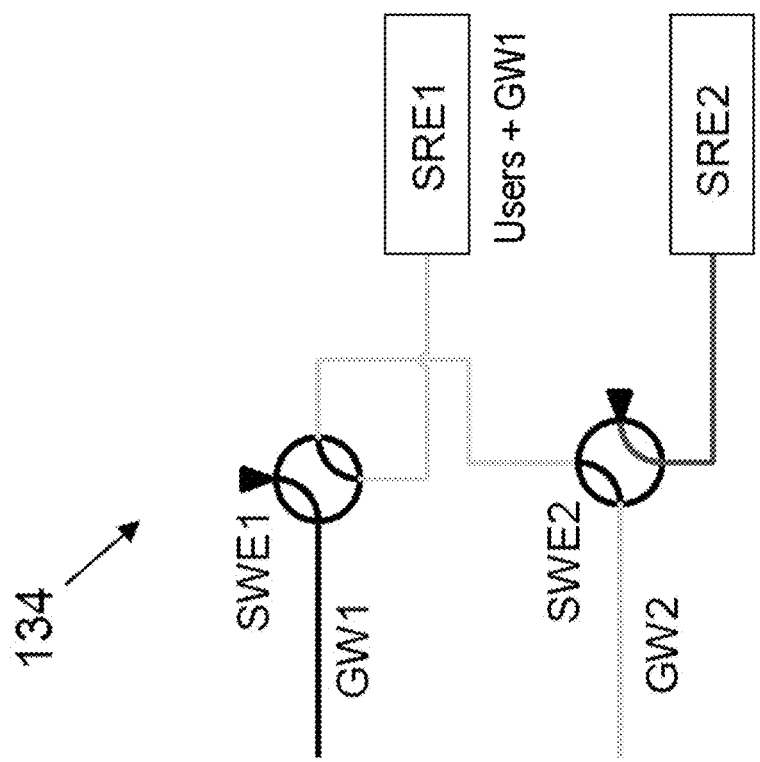
FIG. 10 is a view of the configuration of the output switches of the selection ring, created in the second step of the suppression method according to the invention of FIG. 5, in the case where the setting of the first opposition matrix is determined.

In the second step 306, the output switches of the selection ring 134 are here configured, as shown in FIG. 10, for directing the signals received from the opposition matrix MAT2 of GW2 to the ground calculation station GW1. The repeater channel VR2, including the second opposition matrix MAT2, is connected to the transmission source SRE1 via the switches SWE2 and SWE1, while the repeater channel VR1 is disconnected from the transmission source SRE1.

Figure 11:
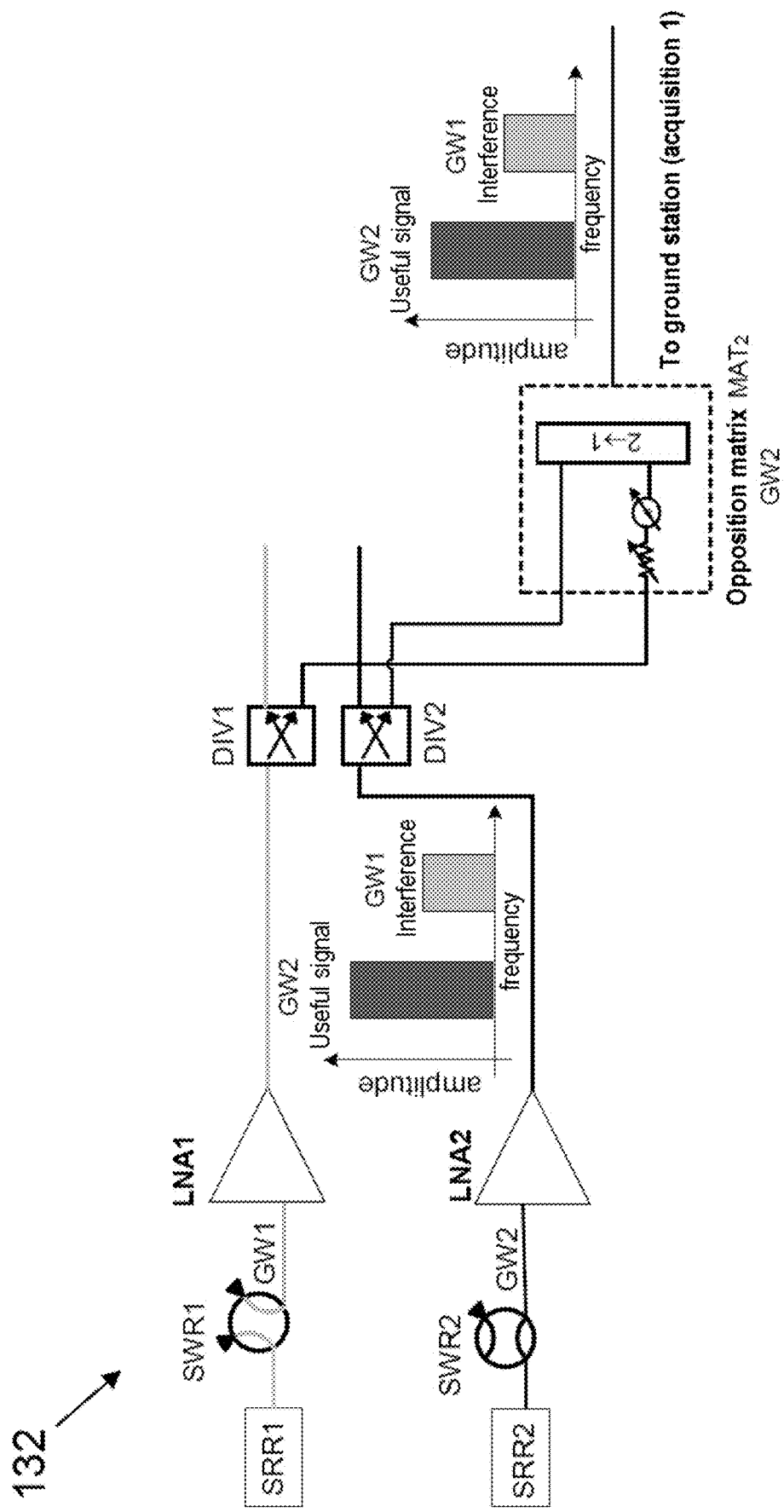
FIG. 11 is a view of the configuration of the input switches of the input switch assembly, together with a view of the levels of the useful and interference signals at the input and output of the second opposition matrix of the communication channel corresponding to the second access station GW2 after the execution of the third and fourth steps of the method for suppressing the interference signal of FIG. 5.

In the third step 308, the first input switch SWR1 of the access GW1 of VR1 is here switched to the OFF position, and the second input switch SWR2 of the access GW2 of VR2 is switched to the ON position, as shown in FIG. 11. In this third step 306, only the multiplex of signals received on the source SRR2 of GW2 is transmitted to the ground to be digitized.

In the fourth step 310, the satellite access station GW1 here receives the multiplex of test signals transmitted by the interfering access station GW1 and the useful access station GW2 and received by the reception source SRR2 and retransmitted by the transmission source SRE1, and digitizes said multiplex into a first useful acquisition signal ACQ2, 2.

Figure 12:
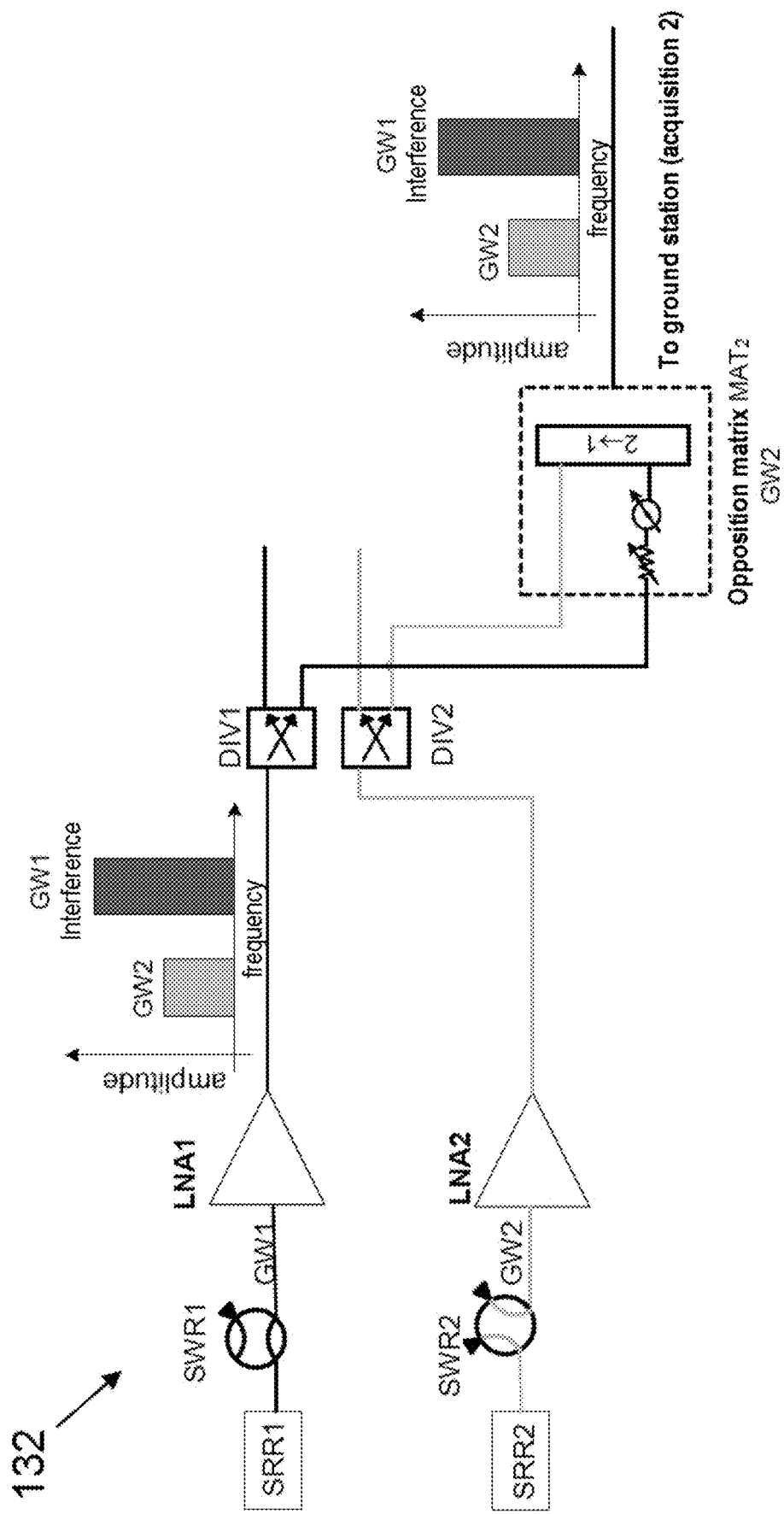
FIG. 12 is a view of the configuration of the input switches, together with a view of the useful and interference signals at the input and output of the second opposition matrix of the communication channel corresponding to the second access station GW2 after the execution of the fifth step of the method for suppressing the interference signal of FIG. 5.

In the fifth step 312, the input switch SWR1 of the access GW1 is here switched to the ON position, and the input switch SWR2 of the access GW2 is switched to the OFF position, as shown in FIG. 12. In this fifth step 312, only the multiplex of signals received on the source SRR1 of the interfering access station GW1 is transmitted to the ground to be digitized. The access station GW1 receives the multiplex of test signals transmitted by the access stations GW1 and GW2, received on the reception source SRR1 and retransmitted by the transmission source SRE1, and digitizes said multiplex into a second interference acquisition signal ACQ2, 1.

In the sixth step 314, a complex coefficient C2,1 is calculated on the ground by correlation between the two acquisition signals, making it possible to reject the interference signal from GW1 present on the access of the second useful access station GW2.

In the seventh step 316, the ground access station GW1 here sends a remote control signal TC for configuring the attenuator/phase shifter of the opposition matrix MAT2 of the access station GW2.

In the eighth step 318, the ground access station GW1 here sends a remote control signal TC for setting the input switches SWR1, SWR2 of the input switch assembly 132 to the ON position and the output switches of the selection ring 134 to the positions of the operational communication service, as shown in FIGS. 2 and 3.

The opposition matrix MAT2, when set in this way, enables a vector summation to be performed between the signal from the first access station GW1 and that from the second access station GW2. The complex coefficient calculated in the sixth step 314 enables the interference signal present on the access SRR2 (i.e. that corresponding to the access station GW1) to be summed in opposition with its replica obtained from the access SRR1.

The interference signal from GW1 on the access SRR2 of the second station GW2 is now sufficiently rejected to reach the C/I GW ratio required by the multi-spot space communication system.

The method for suppressing interference signals with two access stations may be generalized to the case of a multi-beam space communication system having multiple active access stations GWs, that is to say any number N, greater than or equal to 2, of satellite access stations GWi, composed of a useful access station GWi0 and N−1 interfering access stations GWj, j varying from 1 to N and j being different from i0.

It should be noted that, in practice, when problems of interference are encountered between satellite access stations GWs of a multi-spot communication system, the degradation of the C/I GW ratio is very often due to not more than one or two interference signals.

Figure 13:
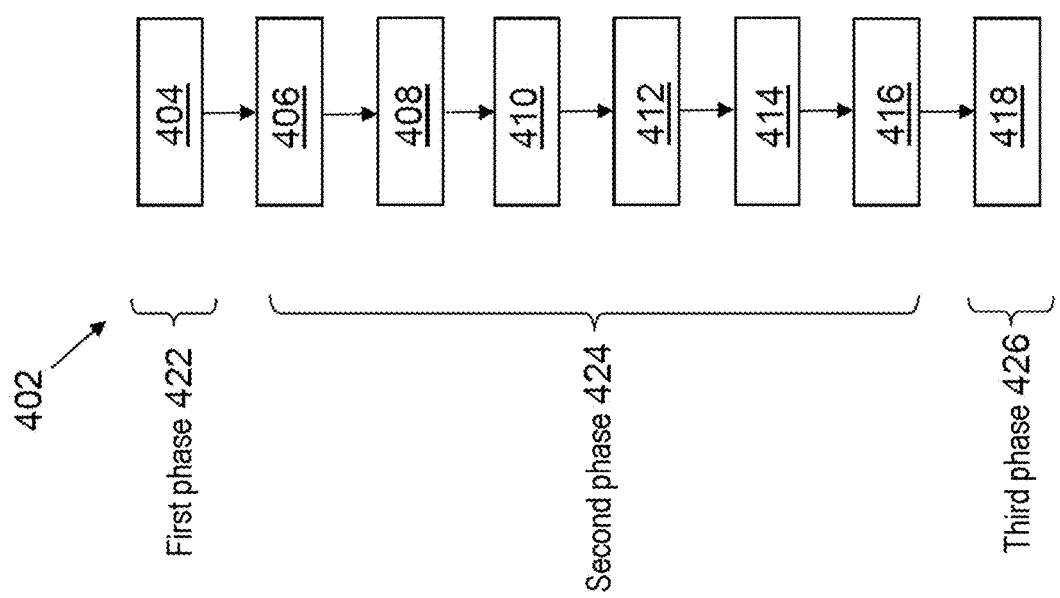
FIG. 13 is a flow chart of the general method according to the invention for suppressing any number N of uplink interference signals.

According to FIG. 13 and in general terms, a method 402 for suppressing uplink interference signals generated between a number N, greater than or equal to 2, of satellite access stations GWi, i varying from 1 to N, which are geographically neighbouring and form part of a multi-spot space communication system, comprises first, second, third, fourth, fifth, sixth, seventh and eighth steps 404, 406, 408, 410, 412, 414, 416, 418, executed in succession.

In a first phase 422, before the launch of the satellite and the first step 404, for a predetermined fixed whole number i0, chosen from among the whole numbers between 1 and N, an opposition matrix MATi0 with N input rows Li0, k, k varying from 1 to N, and a single output terminal is permanently connected at its input to the dividers DIVi, i varying from 1 to N, and at its output to the frequency transposition converter DWNi0.

The input row Li0, i0 is a direct input row connected directly to an output of the divider DIVi0, the N−1 remaining input row(s) Li0, j, j being an index varying from 1 to N and different from i0, being derived opposition rows of the opposition matrix MATi0, connected respectively to the corresponding divider(s) DIVj at one of their outputs. The single output terminal of the opposition matrix MATi0 is connected to the input terminal of the frequency transposition converter DWNi0. The opposition matrix MATi0 comprises input rows Li0, k, k varying from 1 to N, and a combiner COMi0 with N inputs and one output, supplied at its input by the input rows Li0, k, k varying from 1 to N, and connected at its output to the output terminal of the opposition matrix. Each derived opposition input row Li0, j, j varying from 1 to N and being different from i0, includes a different remotely controllable attenuator/phase shifter.

Then, in a second phase 424, executed after the satellite has been launched and the satellite access stations have been brought into service, in the second step 406 a transmission source SREt, t being a predetermined whole number between 1 and N, corresponding to the satellite transmission spot SPEt, covering the satellite access station GWt which comprises a communication spectrum monitoring device CSM, is selected, and the output terminal of the opposition matrix MATi0 is connected to the selected transmission source SREt, while the remaining transmission sources SEs, s being an index varying from 1 to N and different from t, are disconnected by suitably configuring the switches of the output selection ring connected between output terminals of the repeater channels VRi, i varying from 1 to N, and the transmission sources SREi, i varying from 1 to N, of the transmission antenna.

Then, in the third step 408, which is part of the second phase 424, the corresponding reception source SRRi0 of the reception spot SPRi0 covering the satellite access station GWi0 is connected to the direct input row of the opposition matrix MATi0, and the reception sources SRRj, j varying from 1 to N and being different from i0, are disconnected from the N−1 derived opposition input rows Li0, j of the opposition matrix MATi0.

Then, in the second phase 424 and the fourth step 410, the satellite access station GWt, of rank t, receives a multiplex of test signals transmitted by the satellite access stations GWk, k varying from 1 to N, of the first set, and received by the reception source SRRI0 and retransmitted by the transmission source SEt, and digitizes said multiplex into a useful acquisition signal ACQi0, i0.

Then, in the fifth step 412, which is part of the second phase 424, for each remaining reception source SRRj, j varying from 1 to N and being different from i0, the remaining reception source SRRj, corresponding to the reception spot SPRj covering the satellite access station GWj, is connected to the derived opposition row Li0, j of the opposition matrix MATi0, and the reception sources SRRk, k varying from 1 to N and differing from j, are disconnected from the N−1 corresponding input rows Li0, k of the opposition matrix MATi0; then the satellite access station GWt receives a multiplex of test signals transmitted by the satellite access stations GWk, k varying from 1 to N, received by the reception source SRRi0 and retransmitted by the transmission source SREt, and digitizes said multiplex into an interference acquisition signal ACQi0, j.

Then, in the sixth step 414, which is part of the second phase 424, the satellite station GWt causes the computer CSM for spectral monitoring of the received communication signals to calculate, for each interference acquisition signal ACQi0, j, j varying from 1 to N and being different from i0, a complex correlation coefficient Ci0, j between the useful acquisition signal ACQi0, i0 and the interference acquisition signal ACQi0, j, and causes the determination, on the basis of the complex coefficient Ci0, j, of values of attenuation and phase change of the opposition row Li0, j allowing the rejection of the interference signal generated by GWj on the repeater reception access assigned to the access station GWi0.

Then, in the seventh step 416, which is part of the second phase 424, the attenuators/phase shifters of the opposition matrix MATi0 are set by remote control TC to the values of attenuation and phase change determined in the sixth step 414.

Then, in a third phase 426 of implementation of the communication service and the eighth step 418, for i varying from 1 to N, each reception source SRRi of the multi-spot reception antenna is connected to the corresponding transmission source SREi of the transmission antenna through the associated repeater channel VRi, by suitably positioning the switches of the input switching set and its switches of the output selection ring so as to obtain the configuration of the communication service, the opposition matrix MATi0 having been set in the first phase and the second phase so as to suppress the interference signals created by the satellite access stations GWj neighbouring the access station GWi0.

The method for suppressing the uplink interference signals and the multi-spot communication system implementing said suppression method, as described above, make it possible to reduce the equipment required for suppressing the interference signals, thus limiting the effect on the overall figures for the payload in terms of weight, power consumption and dissipation, while offering a high degree of flexibility to operators in their choice of location of the satellite access stations GWs until a very late phase after the start of the development of the multi-spot communication system.

The positions of the switches of the input switching set, the positions of the switches of the output selection ring, and the settings of the attenuators and the phase shifters of the derived opposition rows are, for example, executed on the basis of the sending of remote control signals TC sent by a remote control and measurement station, integrated on the same site as the satellite access station GWt, or positioned separately on a site other than that of the access station GWt and connected to said station GWt by a terrestrial infrastructure.

The waveform of the test signals transmitted by the satellite access stations may be a wide-band white noise, or a comb structure of lines, or the waveform of representative communication signals of the service.

The method and the subsystem for suppressing uplink interference signals are mainly applicable to Ka and Ku multi-spot communication systems which currently constitute the majority of geostationary satellites GEO.

The method and the subsystem for suppressing uplink interference signals according to the invention may also be used for the calibration of a payload from the ground.

If one of the access station sites implements a loop back of the signal transmitted by the access station and a correlation between the transmitted and received signals to extract an amplitude/phase and then sends a remote control signal TC to the satellite to reconfigure the payload with this information, the opposition rule can be calculated on the ground with the suppression method according to the invention as described above.

By means of this invention it is possible to achieve good system performance by reducing the interference between the active satellite access stations of a multi-spot space communication system, without being dependent on their location, at low cost and with a virtually transparent impact on the payload in terms of weight, power consumption and dissipation.

It should be noted that the system of output switches of the selection ring may be replaced by the generation of a beam containing the signals to be processed, aimed at the ground station hosting the CSM.

It should be noted that the multi-spot communication payload may comprise a number of reception antennas, for example one reception antenna for every access station.

If the remote control and measurement station is positioned separately on a site other than that of the satellite access station GWt, and more generally, the remote control and measurement station may be connected to said satellite access station GWt by one or more communication links with or without the use of a terrestrial infrastructure.

The invention claimed is:

1. A method for suppressing uplink interference signals generated between satellite access stations that are geographically neighboring and form part of a multi-spot space communication system, the method comprising:

during a first phase before launch of a satellite, a first step comprising permanently installing an opposition matrix in a first repeater channel of N repeater channels, wherein the opposition matrix comprises N input rows, a first input row of the N input rows being a direct input row connected directly to an output of a first divider of N dividers, and each of the remaining N-1 input rows being a derived opposition row connected respectively to a corresponding one of the remaining N dividers at one output, wherein each derived opposition row comprises a different remotely controllable attenuator or phase shifter, wherein the opposition matrix comprises a single output terminal connected to an input terminal of a frequency transposition converter, and wherein the opposition matrix comprises a combiner with N combiner inputs and one combiner output, the combiner supplied at each of its N combiner inputs by a corresponding one of the N input rows, and the one combiner output connected to the single output terminal of the opposition matrix;

during a second phase after the launch of the satellite and after N satellite access stations have been brought into service, a second step comprising:

selecting a first transmission source from N transmission sources, wherein the first transmission source corresponds to a first neighboring transmission spot of N neighboring transmission spots, the first neighboring transmission spot covering a first satellite access station of the N satellite access stations, the first satellite access station comprising a communication spectrum monitoring device, wherein the single output terminal of the opposition matrix is connected to the first transmission source and each of the remaining N transmission sources are disconnected from a corresponding repeater channel of the N repeater channels, and configuring switches of an output selection ring, the output selection ring connected between output terminals of the N repeater channels and the N transmission sources associated with a transmission antenna;

a third step comprising connecting a first reception source of N reception sources to the direct input row of the opposition matrix and disconnecting the N-1 remaining reception sources from the derived opposition input rows of the opposition matrix, wherein the first reception source corresponds to a first neighboring reception spot of N neighboring reception spots, the first neighboring reception spot covering a second satellite access station of the N satellite access stations;

a fourth step comprising receiving, at the first satellite access station, a first multiplex of test signals and digitizing, by the first satellite access station, the multiplex of test signals into a useful acquisition signal, wherein the first multiplex of test signals are transmitted by at least a portion of the N satellite access stations, received by the first reception source, and retransmitted by the first transmission source;

a fifth step comprising:
  connecting one of the N-1 remaining reception sources to a corresponding one of the derived opposition rows of the opposition matrix and disconnecting the other N-1 remaining reception sources from the derived opposition rows of the opposition matrix wherein the one of the N-1 remaining reception sources corresponds to the reception spot covering a third satellite access station of the N satellite access stations;
  receiving, at the first satellite access station, a second multiplex of test signals and digitizing, by the first satellite access station, the second multiplex of test signals into an interference acquisition signal, wherein the second multiplex of test signals is transmitted by at least a portion of the N satellite access stations, received by the N-1 remaining reception sources and retransmitted by the first transmission source;

a sixth step comprising causing, by the first satellite access station, a computer for spectral monitoring to calculate a first complex correlation coefficient between the useful acquisition signal and the interference acquisition signal and to determine, based at least on the first complex coefficient, an attenuation value and a phase change value associated with the derived opposition rows, the attenuation value and the phase change value configured to cause rejection of the interference signal generated by the remaining reception source connected to the corresponding one of the derived opposition rows of the opposition matrix on a repeater reception access assigned to the second satellite access station; and a seventh step comprising setting, via remote control, the remotely controllable attenuators or phase shifters of the opposition matrix to the attenuation value and the phase change value.

2. The method of claim 1, further comprising:
during the first phase before launch of the satellite, permanently installing a second opposition matrix in a second repeater channel of the N repeater channels, wherein the second opposition matrix comprises N input rows, a first input row of the N input rows being a direct input row connected directly to an output of a first divider of a second set of N dividers, and each of the remaining N-1 input rows being a derived opposition row connected respectively to a corresponding one of the remaining dividers in the second set of N dividers at one output, wherein each derived opposition row of the second opposition matrix comprises a different remotely controllable attenuator or phase shifter, wherein the second opposition matrix comprises a second single output terminal connected to an input terminal of a second frequency transposition converter, and wherein the second opposition matrix comprises a second combiner with N combiner inputs and one combiner output, the second combiner supplied at each of its N combiner inputs by a corresponding one of the N input rows of the second opposition matrix, and the one combiner output of the second combiner connected to the second single output terminal of the second opposition matrix;

during the second phase, connecting the second single output terminal of the second opposition matrix to the first transmission source and disconnecting the remaining N transmission sources from the corresponding repeater channel of the N repeater channels by configuring switches of the output selection ring;

during the third step, connecting a second reception source of the N reception sources to the direct input row of the second opposition matrix and disconnecting the N-1 remaining reception sources from the derived opposition input rows of the second opposition matrix, wherein the second reception source corresponds to a second neighboring reception spot of N neighboring reception spots, the second neighboring reception spot covering a fourth satellite access station of the N satellite access stations;

during the fourth step, receiving, at the first satellite access station, a third multiplex of test signals and digitizing, by the first satellite access station, the third multiplex of test signals into a second useful acquisition signal, wherein the third multiplex of test signals are transmitted by the at least the portion of the N satellite access stations, received by the second reception source, and retransmitted by the first transmission source;

during the fifth step, connecting one of the N-1 remaining reception sources to corresponding one of the derived opposition rows of the second opposition matrix and disconnecting the other N-1 remaining reception sources from the derived opposition rows of the second opposition matrix;

during the fifth step, receiving, at the first satellite access station, a fifth multiplex of test signals and digitizing, by the first satellite access station, the fifth multiplex of test signals into a second interference acquisition signal, wherein the fifth multiplex of test signals is transmitted by the at least the portion of the N satellite access stations, received by the N-1 remaining reception sources and retransmitted by the first transmission source;

during the sixth step, causing by the first satellite access station, the computer for spectral monitoring to calculate a second complex correlation coefficient between the second useful acquisition signal and the second interference acquisition signal and to determine, based at least on the second complex coefficient, a second attenuation value and a second phase change value associated with the derived opposition rows of the second opposition matrix, the second attenuation value and the second phase change value configured to cause rejection of the interference signal generated by the remaining reception source connected to the corresponding one of the derived opposition rows of the second opposition matrix on a repeater reception access assigned to the fourth satellite access station; and during the seventh step, setting, via the remote control, the remotely controllable attenuators or phase shifters of the second opposition matrix to the second attenuation value and the second phase change value.

3. The method of claim 1, wherein the number N is equal to 2 or 3.

4. The method of claim 1, wherein positions of switches of an input switching set, positions of the switches of the output selection ring, and the setting of the remotely controllable attenuators or phase shifters of the opposition matrix are executed by sending of remote controls by the remote control and a measurement station,
   wherein the remote control and the measurement station integrated on a same site as the first satellite access station, or
   wherein the remote control and the measurement station are positioned separately on a site other than that of the first satellite access station and wherein the remote control and the measurement station are connected to the first satellite access station by a terrestrial infrastructure.

5. The method of claim 1, wherein a waveform of test signals transmitted by the N satellite access stations is at least one of a wide-band white noise, a comb structure of lines, or representative communication signals of the service.

6. The method of claim 2, further comprising:
   a third phase for implementation of the communication service, the third phase comprising an eighth step, the eight step comprising connecting each of N reception sources of a multi-spot reception antenna to a corresponding one of the N transmission sources of the transmission antenna through the second repeater channel by positioning switches of an input switching set and the switches of the output selection ring, the first opposition matrix or the second opposition matrix having been set in the first phase and the second phase so as to suppress interference created by neighboring satellite access stations of the second satellite access station.

7. A multi-spot space communication system for suppressing the unlink interference signals generated between geographically neighbouring satellite access stations, the system comprising:
   a telecommunications satellite including an on-board multi-spot communication payload;
   a first set of a whole number N, greater than or equal to 2, of satellite access stations that are geographically neighboring so that they create interference with each other on at least one satellite access; and
   a second set of user terminals;
   the multi-spot communication payload comprising one or more satellite reception antennas, a satellite transmission antenna, and N repeater channels, wherein the one or more satellite reception antenna is configured to receive, in an uplink channel in a reception frequency band, simultaneously and in parallel from N neighboring reception spots, N different reception. radio signals transmitted by the N satellite access stations respectively, each satellite access station being located in a corresponding unique neighboring reception spot, and each N different reception radio signal being delivered by a unique reception source corresponding to the neighboring reception spot of the one or more satellite reception antennas;
   wherein the satellite transmission antenna is configured to transmit in a downlink channel. in a transmission frequency band, simultaneously and in parallel towards N neighboring transmission spots, the N different reception radio signals received, amplified, and uniformly frequency transposed each of the N neighboring transmission spots covering the corresponding satellite access station having a coverage identical to that of the unique reception spot;
   wherein each of the N repeater channels is nominally contained between the corresponding unique reception source and a corresponding transmission source of N transmission sources, and wherein each of the N repeater channels comprises, downstream of the corresponding unique reception source, a reception amplifier and an RF divider with one input and N outputs, and a transposition frequency converter and reducer connected to an output of the RE divider,
   wherein the second set of user terminals are distributed over the N neighboring transmission spots;
   wherein the N satellite access stations comprises a first satellite access station corresponding to a first neighboring transmission spot of the N neighboring transmission spots, the first neighboring transmission spot covering the first satellite access station, and wherein the first satellite access station comprises a communication spectrum monitoring device;
   wherein the multi-spot communication payload comprises switches of an input switch assembly and switches of an output, selection ring, wherein the switches of the input switch assembly are connected between input terminals of repeater channels and reception sources of the one or more satellite reception antennas, and wherein the switches of the output selection ring are connected between output terminals of the N repeater channels and the N transmission sources of the transmission antenna; and
   wherein the multi-spot communication payload comprises at least one opposition matrix, the at least one opposition matrix comprising N input rows, a first input row of the N input rows being a direct input row connected directly to an output of a first divider of N dividers, and each of the remaining N-1 input rows being a derived opposition row connected respectively to a corresponding one of the remaining N dividers at one output, wherein each derived opposition row comprises a different remotely controllable attenuator or phase shifter, wherein the at least one opposition matrix comprises a single output terminal connected to an input terminal of a frequency transposition converter, and wherein the at least one opposition matrix comprises a combiner with N combiner inputs and one combiner output, the combiner supplied at, each of its N combiner inputs by a corresponding one of the N input rows, and the one combiner output connected to the single output terminal of the at least one opposition matrix.

8. The system of claim 7, wherein the on-board multi-spot communication payload is configured to, in a second phase after the telecommunications satellite has been launched and the N satellite access stations have been brought into service:
- in a second step, select a first transmission source of the N transmission sources, wherein the first transmission source corresponds to the first neighboring transmission spot, connect the single output terminal of the at least one opposition matrix to the selected first transmission source, and disconnect the remaining N transmission sources by suitably configuring the switches of the output selection ring;
- in a third step, connect a first reception source of N reception sources to the direct input row of the at least one opposition matrix and disconnect the N-1 remaining reception sources from the derived opposition input rows of the at least one opposition matrix, wherein the first reception source corresponds to a first neighboring reception spot of N neighboring reception spots,
- wherein the first satellite access station is configured to, in a fourth step, receive a first multiplex of test signals and digitizing, by the first satellite access station, the first multiplex of test signals into a useful acquisition signal, wherein the first multiplex of test signals are transmitted by at least a portion of the N satellite access stations, received by the first reception source, and retransmitted by the first transmission source;
- wherein the on-board multi-spot communication payload is configured to in a fifth step, connect one of the N-1 remaining reception sources to a corresponding one of the derived opposition rows of the at least one opposition matrix and disconnect the other N-1 remaining reception sources from the derived opposition rows of the at least one opposition matrix wherein the one of the N-1 remaining reception sources corresponds to the, reception spot covering a third satellite access station of the N satellite access stations;
- wherein the first satellite access station is configured to:
  - in the same fifth step, receive a second multiplex of test signals and digitize the second multiplex of test signals into an interference acquisition signal, wherein the second multiplex of test signals is transmitted by at least a portion of the N satellite access stations, received by the N-1 remaining reception sources and retransmitted by the first transmission source; and
  - in a sixth step, cause the communication spectrum monitoring device to calculate, calculate a first complex correlation coefficient between the useful acquisition signal and the interference acquisition signal and to determine, based at least on the first complex coefficient, an attenuation value and a phase change value associated with the derived opposition rows, the attenuation value and the phase change value configured to cause rejection of the interference signal generated by the remaining reception source connected to the corresponding one of the derived opposition rows of the at least one opposition matrix on a repeater reception access assigned to a second satellite access station of the N satellite access stations; and
- wherein the on-board multi-spot communication payload is configured to in a seventh step, set the remotely controllable attenuators or phase shifters of the at least one opposition matrix by remote control to the attenuation value and the phase change value.

9. The multi-spot space communication system of claim 7, wherein the on-board multi-spot communication payload comprises N opposition matrices, each of the N opposition matrices comprising N input rows and a single output terminal, a first input row of the N input rows being a direct input row connected directly to an output of a first divider of N dividers, and each of the remaining N-1 input rows being a derived opposition row connected respectively to a corresponding one of the remaining N dividers at one output, wherein each derived opposition row comprises a different remotely controllable attenuator or phase shifter, wherein the at least one opposition matrix comprises a single output terminal connected to an input terminal of a frequency transposition converter, and wherein the at least one opposition matrix comprises a combiner with N combiner inputs and one combiner output, the combiner supplied at each of its N combiner inputs by a corresponding one of the N input rows, and the one combiner output connected to the single output terminal of the at least one opposition matrix,
- and wherein the on-board multi-spot communication payload is configured to, after the telecommunications satellite has been launched and the N satellite access stations have been brought into service:
  - in a second step, select a first transmission source from N transmission sources, wherein the first transmission source corresponds to a first neighboring transmission spot of N neighboring transmission spots, the first neighboring transmission spot covering a first satellite access station of the N satellite access stations, the first satellite access station comprising a communication spectrum monitoring device, wherein the single output terminal of the opposition matrix is connected to the first transmission source and each of the remaining N transmission sources are disconnected from a corresponding repeater channel of the N repeater channels by suitably configuring the switches of the output selection ring connected between output terminals of the N repeater channels and the N transmission sources of the transmission antenna;
  - a third step, connect each unique reception source to the direct input row of the corresponding opposition matrix and disconnecting the N-1 remaining reception sources from the derived opposition input rows of the corresponding opposition matrix, wherein each unique reception source corresponds to a particular neighboring reception spot of N neighboring reception spots, each neighboring reception spot coverin g a corresponding satellite access station of the N satellite access stations;
  - in a fifth step, after a fourth step wherein the first satellite access station receives a multiplex of test signals and digitizes the multiplex of test signals into a useful acquisition signal, i, wherein the multiplex of test signals are transmitted by at least a portion of the N satellite access stations, received by the first reception source, and retransmitted by the first transmission source,
    - connect one of the N-1 remaining reception sources to a corresponding one of the derived opposition rows of the opposition matrix and disconnect the other N-1 remaining reception sources from the derived opposition rows of the opposition matrix, wherein the one of the N-1 remaining reception sources corresponds to the reception spot covering a third satellite access station of the N satellite access stations.

10. The multi-spot space communication system according to claim 9, wherein the first satellite access station is configured to:

n the fifth step, receive, at the first satellite access station, a second multiplex of test signals and digitizing, by the first satellite access station, the second multiplex of test signals into an interference acquisition signal, wherein the second multiplex of test signals is received by the N-1 remaining reception sources and retransmitted by the first transmission source; and in a sixth step, cause, by the first satellite access station, a computer for spectral monitoring to calculate a complex correlation coefficient between the useful acquisition signal and the interference acquisition signal and to determine, based at least on the complex coefficient, an attenuation value and a phase change value associated with the derived opposition rows of each of the N opposition matrices, the attenuation value and the phase change value configured to cause rejection of the interference signal generated by the remaining reception source connected to the corresponding one of the derived opposition rows of each of the N opposition matrices on a repeater reception access assigned to the corresponding satellite access station of the N satellite access stations; and wherein the on-board multi-spot communication payload is configured to, in a seventh step, set, via remote control, the remotely controllable attenuators or phase shifters of each of the N opposition matrices to the corresponding attenuation value and the corresponding phase change value.

11. The multi-spot space communication system according to claim 7, wherein the number N is greater than or equal to 2 and less than or equal to 8.

12. The multi-spot space communication system of claim 7, wherein positions of the switches of the input switch assembly, positions of the switches of the output selection ring, and settings of the different remotely controllable attenuator or phase shifter are executed based on sending of remote controls by a remote control and a measurement station, wherein the remote control and the measurement station integrated on a same site as the first satellite access station, or wherein the remote control and the measurement station are positioned separately site other than that of the first satellite access station and wherein the remote control and the measurement station are connected to the first satellite access station by a terrestrial infrastructure.

* * * * *

UNITED STATES PATENT AND TRADEMARK OFFICE
CERTIFICATE OF CORRECTION

| | |
|---|---|
| PATENT NO. | : 11,888,576 B2 |
| APPLICATION NO. | : 17/479908 |
| DATED | : January 30, 2024 |
| INVENTOR(S) | : Walid Karoui |

It is certified that error appears in the above-identified patent and that said Letters Patent is hereby corrected as shown below:

In the Claims

In Claim 7, Column 22, Line 3, "N different reception. radio signals" should be -- N different reception radio signals --.

In Claim 8, Column 23, Line 36, "corresponds to the, reception spot" should be -- corresponds to the reception spot --.

In Claim 9, Column 24, Line 49, "N neighboring reception spots, each neighboring reception spot coverin g a corresponding" should be -- N neighboring reception spots each neighboring reception spot covering a corresponding --.

In Claim 10, Column 25, Line 4, "n the fifth step," should be -- in the fifth step, --.

Signed and Sealed this
Nineteenth Day of March, 2024

Katherine Kelly Vidal
*Director of the United States Patent and Trademark Office*